(12) United States Patent
Fang et al.

(10) Patent No.: US 12,513,575 B2
(45) Date of Patent: *Dec. 30, 2025

(54) PROXIMITY-BASED SESSION HANDOVER

(71) Applicant: Zoom Video Communications, Inc., San Jose, CA (US)

(72) Inventors: Jin Fang, Saratoga, CA (US); Wei Guo, San Jose, CA (US)

(73) Assignee: Zoom Communications, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/654,747

(22) Filed: May 3, 2024

(65) Prior Publication Data

US 2024/0292280 A1 Aug. 29, 2024

Related U.S. Application Data

(63) Continuation of application No. 17/390,102, filed on Jul. 30, 2021, now Pat. No. 12,010,563, which is a continuation-in-part of application No. 17/238,907, filed on Apr. 23, 2021, now Pat. No. 11,917,482.

(51) Int. Cl.
*H04W 36/00* (2009.01)
*H04W 4/48* (2018.01)
*H04W 36/32* (2009.01)

(52) U.S. Cl.
CPC .......... *H04W 36/0011* (2013.01); *H04W 4/48* (2018.02); *H04W 36/0083* (2013.01); *H04W 36/324* (2023.05); *H04W 36/037* (2023.05)

(58) Field of Classification Search
CPC .... H04W 36/32; H04W 36/0011; H04W 4/50

USPC .......................................................... 455/440
See application file for complete search history.

(56) References Cited

U.S. PATENT DOCUMENTS

| | | |
|---|---|---|
| 6,195,545 B1 | 2/2001 | Baker et al. |
| 8,208,913 B2 | 6/2012 | Allen et al. |
| 8,326,276 B2 | 12/2012 | Chin et al. |
| 8,934,869 B2 | 1/2015 | Edara et al. |
| 9,125,144 B1 | 9/2015 | Orbach et al. |
| 9,172,813 B2 | 10/2015 | Kannan K |
| 9,571,974 B2 | 2/2017 | Choi et al. |
| 10,440,091 B2 | 10/2019 | Ban et al. |
| 11,165,789 B1 | 11/2021 | Smith |
| 2011/0167460 A1 | 7/2011 | Tranchina |
| 2014/0173036 A1 | 6/2014 | Das |
| 2014/0279889 A1 | 9/2014 | Luna |
| 2014/0354441 A1 | 12/2014 | Luna |
| 2015/0256795 A1 | 9/2015 | Chauhan |

(Continued)

OTHER PUBLICATIONS

International Search Report and Written Opinion mailed on Jul. 7, 2022 in corresponding PCT Application No. PCT/US2022/024738.

*Primary Examiner* — Joel Ajayi
(74) *Attorney, Agent, or Firm* — Young Basile Hanlon & MacFarlane, P.C.

(57) ABSTRACT

Sessions in progress are seamlessly moved between devices of a software platform. Proximity-based session handovers are performed between devices of the software platform utilizing ultrasound signals. The ultrasound signals include a frequency signature. The frequency signature is associated with a stationary device. A handover of a session in progress from a mobile device to the stationary device is performed based on the detection of the ultrasound signal.

20 Claims, 12 Drawing Sheets

(56) References Cited

U.S. PATENT DOCUMENTS

| | | |
|---|---|---|
| 2016/0066254 A1 | 3/2016 | Colby et al. |
| 2016/0248779 A1 | 8/2016 | Pappo et al. |
| 2017/0208549 A1* | 7/2017 | Desai .................... H04W 76/28 |
| 2017/0208632 A1 | 7/2017 | Gunasekara et al. |
| 2018/0176270 A1 | 6/2018 | Griffin et al. |
| 2020/0120401 A1 | 4/2020 | van Scheltinga et al. |
| 2020/0204963 A1 | 6/2020 | Park et al. |
| 2021/0152986 A1 | 5/2021 | Chen |
| 2022/0256001 A1 | 8/2022 | Inamdar et al. |

* cited by examiner

PROXIMITY-BASED SESSION HANDOVER

CROSS-REFERENCE TO RELATED APPLICATION(S)

This application is a continuation of U.S. patent application Ser. No. 17/390,102, filed Jul. 30, 2021, which is a continuation-in-part of U.S. patent application Ser. No. 17/238,907, filed Apr. 23, 2021, the entire disclosures of which are hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services accessible over a network, such as the Internet, to deliver a complete communication experience regardless of physical location.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
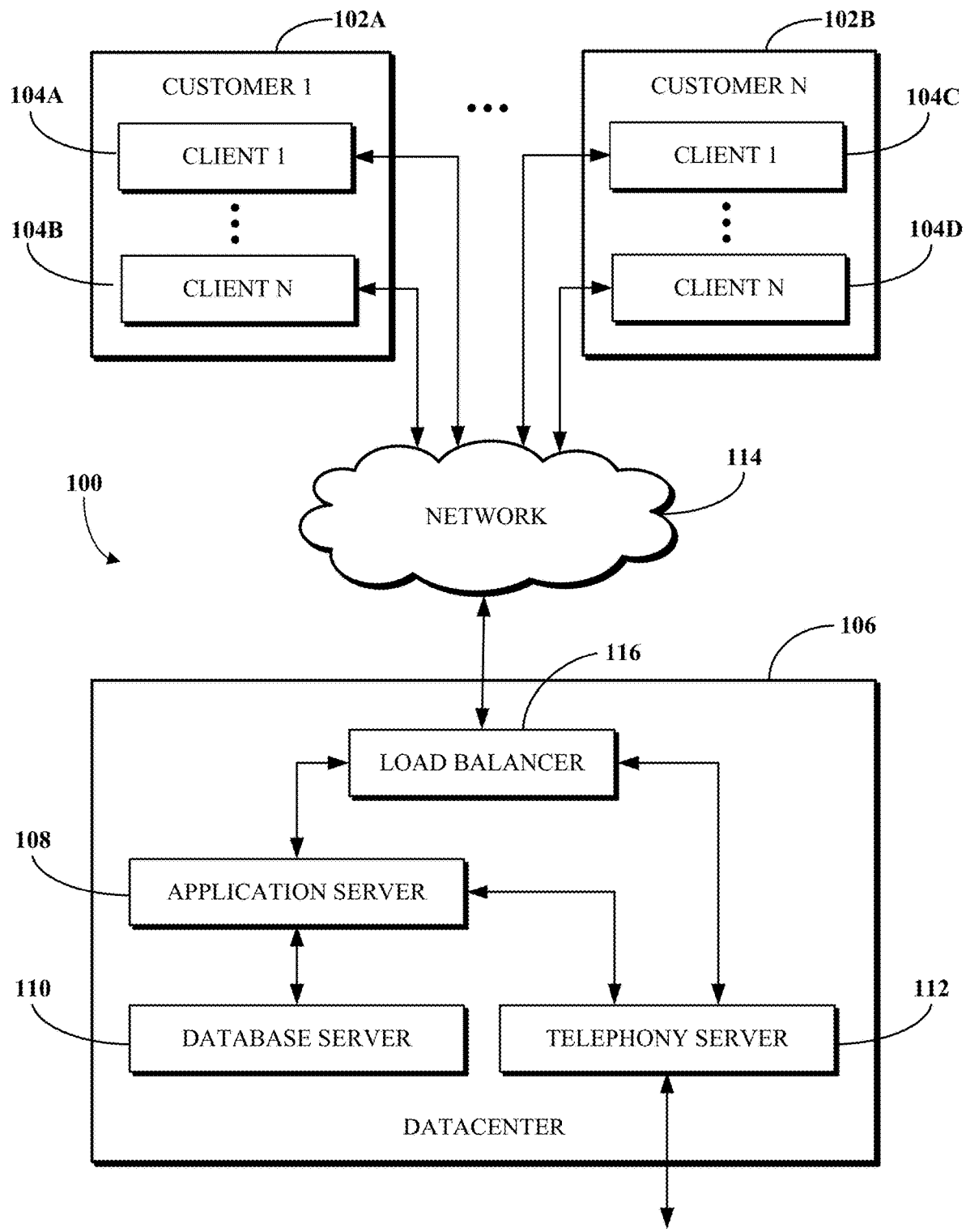
FIG. 1 is a block diagram of an example of an electronic computing and communications system.

Disclosed herein are, inter alia, implementations of systems and techniques for performing proximity-based session handover.

One aspect of this disclosure is a method that includes detecting a short range signal. The short range signal may be detected at a mobile device. The short range signal may include a frequency signature. The frequency signature may be associated with an infotainment device of a vehicle. The method includes displaying, on the mobile device, a request to confirm a handover of a session in progress from the mobile device to the infotainment device. Responsive to receiving a confirmation, the method includes performing a handover of the session in progress, or a component thereof, to the infotainment device. The method includes continuing the session in progress, or a component thereof, at the infotainment device. The method includes terminating the session in progress at the mobile device.

Another aspect of this disclosure is a system that includes an infotainment device of a vehicle, a mobile device, and a server. The infotainment device of the vehicle may include an in-vehicle internet source. The infotainment device may be configured to transmit a short range signal. The mobile device may be configured to detect the short range signal. The short range signal may include a frequency signature. The frequency signature may be associated with the infotainment device. The mobile device may be configured to display a request to confirm a handover of a session in progress to the infotainment device. The mobile device may be configured to perform a handover of the session in progress, or a component thereof, to the infotainment device. The infotainment device may be configured to continue the session in progress, or a component thereof, using the in-vehicle internet source.

Another aspect of this disclosure is a mobile device that includes a component, a display, and a processor. The component may be configured to detect a short range signal. The short range signal may include a frequency signature of an infotainment device of a vehicle. The display may be configured to display a request to confirm a handover of a session in progress, or a component thereof, from the mobile device to the infotainment device. The processor may be configured to switch the mobile device to a hotspot mode to use the mobile device as an internet source for the vehicle. The processor may be configured to perform a handover of the session in progress, or a component thereof, to the infotainment device to continue the session in progress, or a component thereof, at the infotainment device using the mobile device as the internet source. The processor may be configured to terminate the session in progress at the mobile device.

A software platform may include multiple software applications usable for different types of interactions. For example, a UCaaS platform may include one software application for video or audio conferencing, another for email messaging, another for chat or instant messaging, and so on. The software applications may be accessed using devices in communication with the software platform. A user of the software platform may thus have multiple devices which may be usable to access one or more of those software applications. For example, the user may use some combination of a desk phone, a mobile device, and a computer, in which functionality of one or more software applications of the software platform is accessible at some combination of those devices. However, when the user starts an interaction through a software application at one device and wants to move it to another device (e.g., because the user is moving to a new location or for other reasons), limitations of a typical software platform require the user to log into the software application at the other device to restart the interaction at that other device. This process can be disruptive to the interaction, such as by delaying the interaction while the user logs back into the software application.

Typical systems are not capable of determining the proximity of devices to perform a session handover. Furthermore, typical systems cannot continue a first session at a second device because a first session at a first device cannot be moved, and therefore a second session at the second device must be initialized. Accordingly, typical systems disrupt the continuity of the session during handover from the first device to the second device.

Implementations of this disclosure address problems such as these using software for performing a proximity-based session handover of a session between devices. A session is, includes, or otherwise refers to an interaction by an operator of the device with a software application of the software platform. A session may be initiated at a first device. A second device may transmit a short range signal that is detected by the first device. The short range signal may include an ultrasonic signal, an infrared (IR) signal, an ultra-wideband (UWB) signal, a near-field communication (NFC) signal, a dedicated short range communication (DSRC), or a Bluetooth signal. In some examples, the short range signal may have a transmission distance of 5 meters or less. The short range signal may include a frequency signature associated with the second device, where the frequency signature is a unique frequency associated with the second device at which the second device transmits the short range signal. In response to detecting the short range signal, the first device may transmit a request to perform a handover to continue the session in progress on the second device. The session in progress is transferred from the first device to the second device while the session remains in progress. The session in progress may be transferred using a communication channel opened between the first device and the second device. The operator may then continue the session at the second device. The session may eventually either be terminated at the second device or transferred, such as back to the first device or to a third device.

In an example, a user may initiate a phone call or video conference on their mobile device in their office. The user may decide to walk from their office to a conference room during their phone call or video conference. The conference room may include a conferencing device. In some examples, the conferencing device may be a voice assistant device. The conferencing device may emit a short range signal, and the user may enter the conference room with their mobile device while on a phone call or video conference. When the mobile device is within a predetermined proximity of the conferencing device, the mobile device may detect the short range signal. In response to detecting the short range signal, the phone call or video conference may be seamlessly transferred to the conferencing device such that the phone call or video conference is continued on the conferencing device without interruption.

In another example, a user may initiate a phone call or video conference on their mobile device in their home or office. The user may decide to walk from their home or office to their vehicle during their phone call or video conference. The vehicle, for the purposes of this disclosure, may be any vehicle including, for example, an automobile, aircraft, spacecraft, watercraft, public transportation vehicles such as subways and trains, and hyperloop vehicles. The vehicle may include a conferencing device. The conferencing device may be associated with or integrated with an infotainment device of the vehicle. The conferencing device may be a separate device from the infotainment device. The infotainment device may include hardware and software components that include a radio, an audio player, a video player, a navigation system, USB and Bluetooth connectivity, in-vehicle internet, Wi-Fi, ZigBee, Z-wave, NFC, or any combination thereof. The conferencing device may emit a short range signal. The user may enter the vehicle with their mobile device while on a phone call or video conference. When the mobile device is within a predetermined proximity of the conferencing device, such as inside the vehicle, the mobile device may detect the short range signal. In response to detecting the short range signal, the phone call or video conference may be seamlessly transferred to the infotainment device of the vehicle such that the phone call or video conference is continued via the infotainment device of the vehicle, for example, without interruption. The seamless transfer of the phone call or video conference may include terminating the phone call or video conference on the mobile device after the transfer such that the phone call or video conference is continued without interruption. In some examples, the seamless transfer of the phone call or video conference may include terminating the phone call or video conference on the mobile device during the transfer such that any gap that exists is minimal or imperceptible. For example, the phone call or video conference may be continued on the infotainment device using the in-vehicle internet or via the mobile device using Bluetooth or USB connectivity. In some examples, a component of the video conference, such as the audio component of the video conference, may be continued via the infotainment device of the vehicle. In some examples, the short range signal may be transmitted based on a trigger such as sensing a hand on the door handle of the vehicle, sensing the vehicle door opening, turning on the ignition of the vehicle, a detection of the vehicle key within a predetermined proximity of the vehicle, or a detection of the mobile device within a predetermined proximity of the vehicle. In some examples, the short range signal may be transmitted when the vehicle is stationary, such that the transmission of the short range signal is terminated when the vehicle is in motion. Termination of the short range signal is associated with the ability of the mobile device to connect to the conferencing device. The mobile device will not disconnect from the conferencing device when the short range signal transmission is terminated.

To describe some implementations in greater detail, reference is first made to examples of hardware and software structures used to implement a system and method for performing proximity-based session handover. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
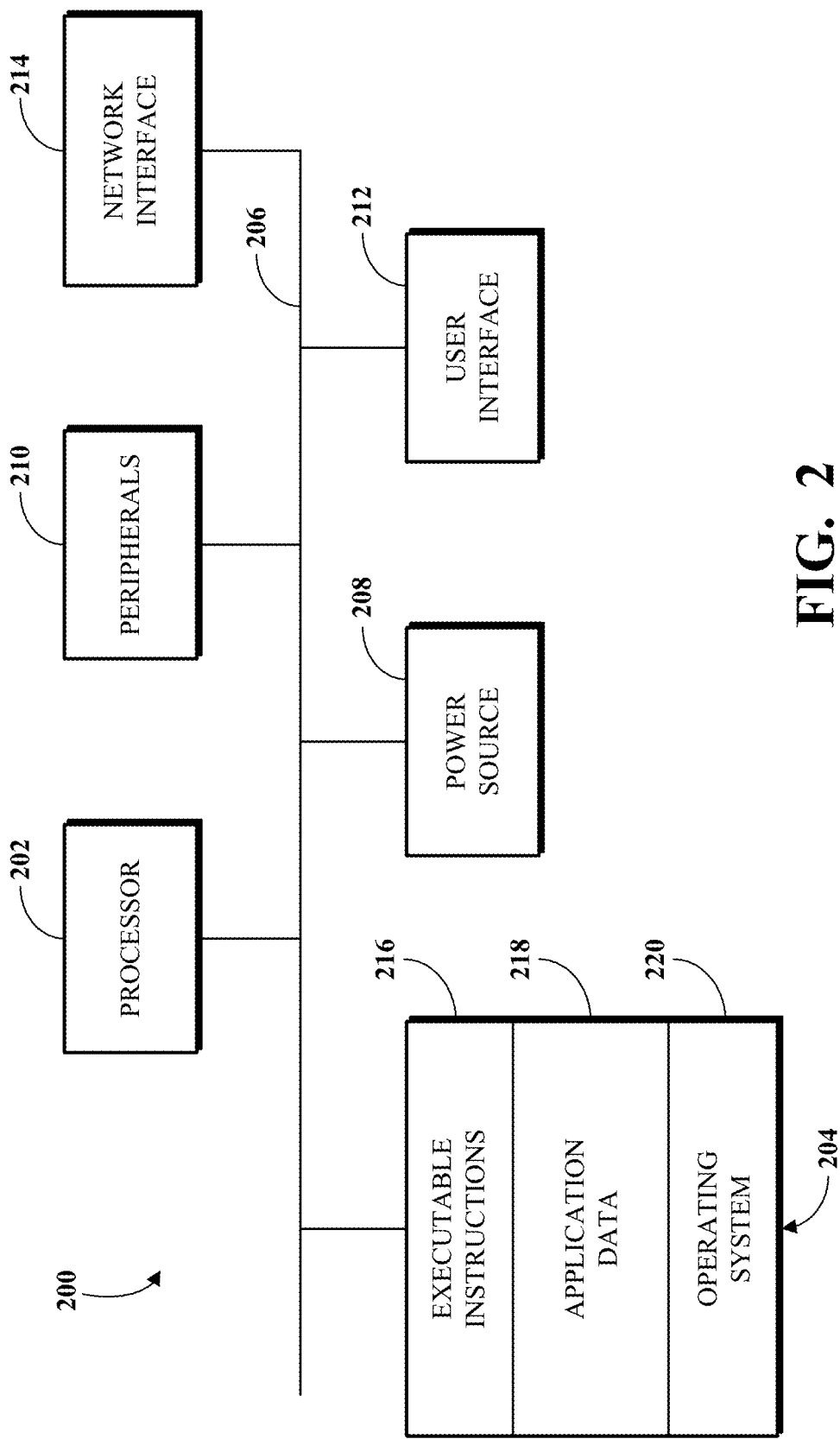
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone, tablet device laptop computer, or another portable computing device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
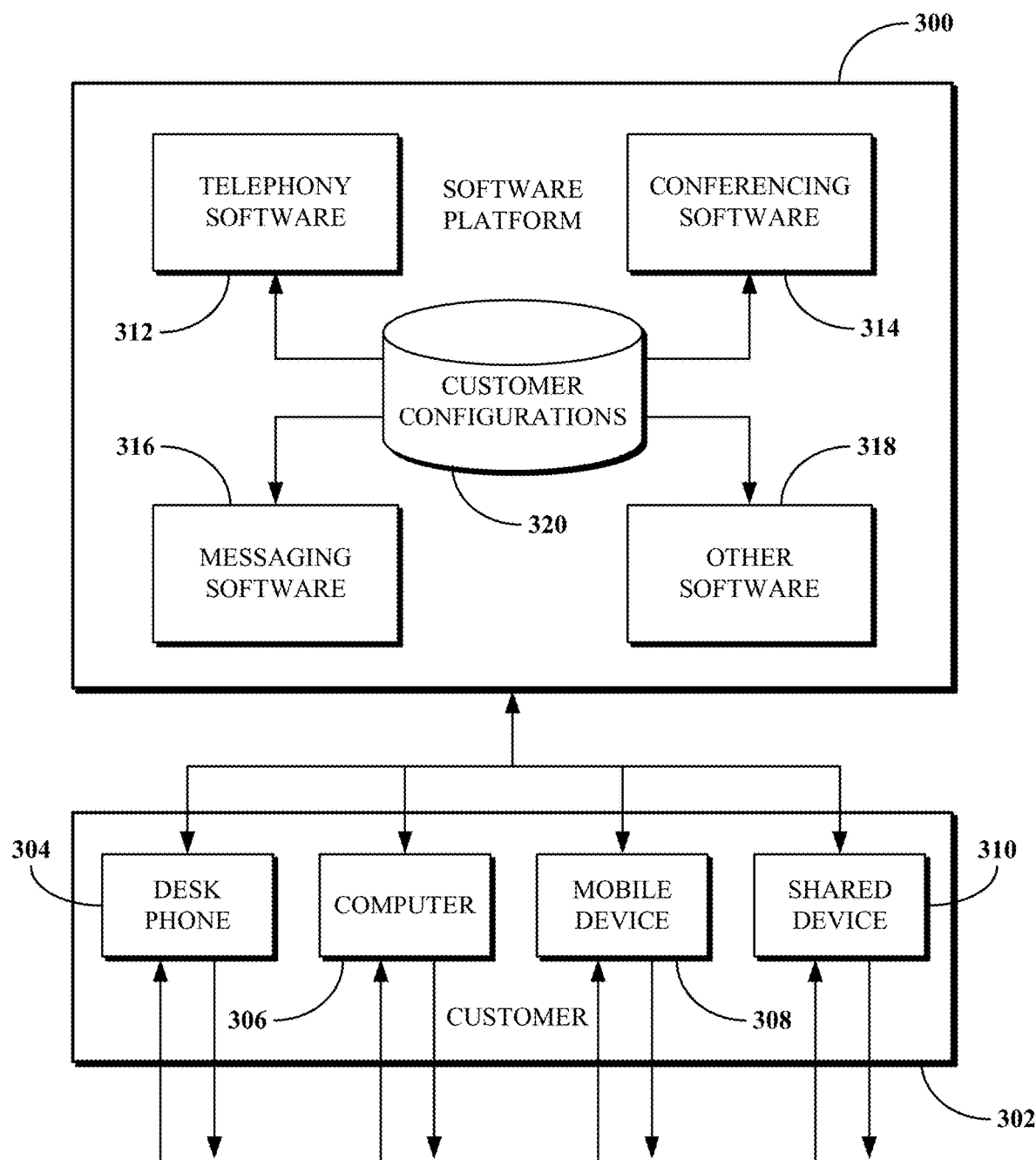
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIPenabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include handover software that is configured to perform a proximity-based session handover from one client or device to another client or device. In some examples, the proximity-based session handover may be performed from one client to a non-client device.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
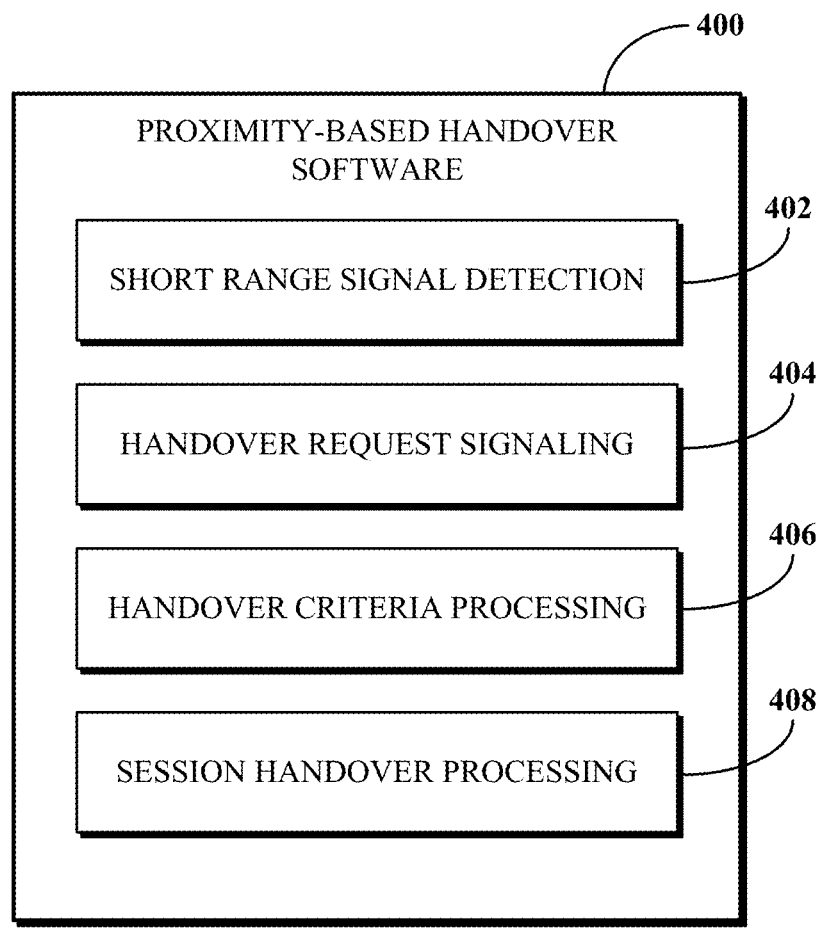
FIG. 4 is a block diagram showing example functionality of proximity-based session handover software of a software platform.

FIG. 4 is a block diagram showing example functionality of proximity-based session handover software 400 of a software platform, which may, for example, be the software platform 300 shown in FIG. 3. For example, the proximity-based session handover software 400 may be the proximity-based session handover software described above with respect to the other software 318, clients 304 through 310, or both. In an example, the proximity-based session handover software 400 may be associated exclusively with one or more of the clients 304 through 310. In another example, the proximity-based session handover software 400 may be associated with both the client and the sever in which different operations are performed at each. The proximity-based session handover software 400 includes tools for detecting a short range signal, handover request signaling, and performing a proximity-based session handover of a session in progress. As shown, the proximity-based session handover software 400 includes a short range signal detection tool 402, a handover request signaling tool 404, an interaction indication signaling tool 406, a handover criteria processing tool 408, and session handover processing tool 410.

The short range signal detection tool 402 detects a short range signal that has been transmitted from a client or device. For example, the short range signal detection tool 402 may receive an indication that a component, such as a short range signal receiver or a microphone of a first device, received the short range signal transmitted by a second device. In this example, the first device may be a mobile device, such as a mobile phone, a tablet computing device, or a laptop computer, and the second device may be a stationary device, such as a conferencing device of a vehicle configured for audio and/or visual conferencing. The conferencing device may be associated with or integrated with an infotainment device of the vehicle. In this example, the first device has a session that is currently in progress. As described above, the session is, includes, or otherwise refers to an interaction by an operator of the client or device with a software application of the software platform. In particular, the interaction is one or more of a phone call, an audio conference, a video conference, a chat conversation, or another communication-based interaction. The interaction may, for example, be enabled by one or more of the software 312 through 318 shown in FIG. 3. For example, a session may be an audio or video conference implemented by the conferencing software 314 between some number of participants including the operator of the client or device. The operator may, for example, be a human user of the first device, a software intelligence unit configured to use the first device, or another entity configured for client or device operation.

The handover request signaling tool 404 signals a request to perform a handover of the session in progress from the first device to the second device, for example, via a transmitter of the first device. The request may be transmitted based on a threshold duration of time that the short range signal is detected to avoid performing an unintended handover. In an example of a vehicle, the request may be transmitted on a condition that the vehicle is stationary. In another example, the request may be transmitted based on a user-defined or employer-defined configuration. For example, if it is a company vehicle, the request may be transmitted based on a confirmation that the first device is a company device. The request may be a request to perform a handover of the session in progress from the first device to the second device. The request may be a request to perform a handover of one or more components of the session in progress, for example, an audio component or a video component. In an example, the request may be transmitted based on a vehicle motion status. For example, if the vehicle motion status indicates that the vehicle is in motion, the request may be to perform a handover of the audio component of the session in progress. If the vehicle motion status indicates that the vehicle is stationary, the request may be to perform a handover of the audio component of the session in progress, the video component of the session in progress, or both. The request may include a sharing key. The sharing key may be a secure code to associate the first device and the second device.

The handover criteria processing tool 406 determines whether to perform a handover of the session from a current client or device, that is, a client or device at which the session is currently in progress, to a different client or device, such as one of the clients or devices to which the handover request is signaled. To determine whether to handover the session, the handover criteria processing tool 406 considers one or more handover criteria, which may, for example, correspond to one or more of a detection of the short range signal associated with the second device, a verification by the operator to handover the session to the second device, or another criterion.

For example, software, which may be the proximity-based session handover software 400, the software application implementing the session, or another software aspect of the software platform, may output a graphical user interface (GUI) to a display associated with the first device to enable the operator thereof to verify the handover of the session to a selected or otherwise identified other client or device (i.e., the second device in this example). The operator of the first device may be detected within a predetermined proximity associated with the second device to which the session will be switched, for example, using a short range ranging functionality of the second device.

The session handover processing tool 408 performs a handover to switch the session in progress from one client or device to another, for example, based on the respective operations performed by the tools 402 through 406. For example, if the handover criteria processing tool 406 determines that the handover criteria is met, the session handover processing tool 408 opens a communication channel between the first device, as the device on which the session was initiated or on which the session is otherwise currently in progress, and the second device, as the device to which the session is to be switched. The communication channel is some connection usable to transmit information associated with the session over a network, for example, the network 114 shown in FIG. 1. The communication channel may be a direct connection between the first device and the second device. Alternatively, the communication channel may use the proximity-based session handover software 400 or the software platform as an intermediary.

Once the communication channel is opened, the session handover processing tool 408 causes an importing of information associated with the session from the first device to the second device, either directly or through an intermediary (e.g., the proximity-based session handover software 400 or the software platform). The imported information includes information usable by the second device to continue the session at the second device. For example, the imported information may identify a software application which implements the session, instructions for launching that software application at the second device, contents of the session, or other information.

Although the tools 402 through 408 are shown as functionality of the proximity-based session handover software 400 as a single piece of software, in some implementations, some or all of the tools 402 through 408 may exist outside of the proximity-based session handover software 400 and/or the software platform may exclude the proximity-based session handover software 400 while still including the tools 402 through 408 elsewhere.

Figure 5:
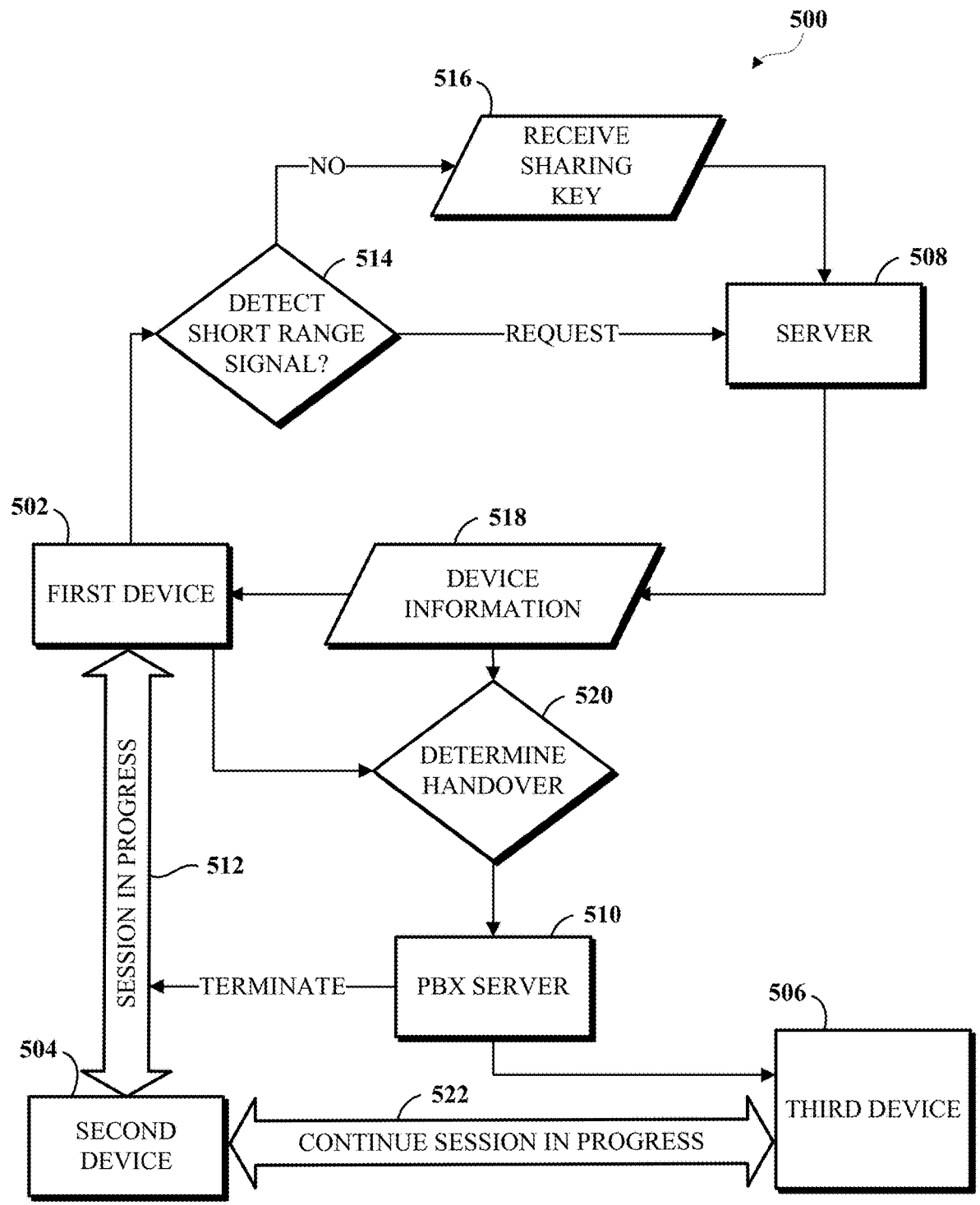
FIG. 5 is a flow diagram of an example of a system performing a proximity-based session handover.

FIG. 5 is a flow diagram of an example of a system 500 performing a proximity-based session handover. The system 500 includes a first device 502, a second device 504, a third device 506, a server 508, and a PBX server 510. In this example, the first device 502 may be a mobile device, such as a mobile phone, a tablet computing device, a laptop computer, or another mobile device. The second device 504 may be a mobile device or a stationary device, such as a mobile phone, a tablet computing device, a laptop computer, a desktop computer, a desk phone, a room appliance, a video conferencing system, a teleconferencing system, or another mobile or stationary device. The third device 506 may be a stationary device, such as a desk phone, a room appliance, a video conferencing system, a teleconferencing system, an infotainment device of a vehicle, a conferencing device for use in a vehicle, or another stationary device.

The first device 502 may have a session in progress 512 with the second device 504. The session in progress 512 may be an interaction such as a video or audio conference, an email messaging session, a chat or instant messaging session, or any combination thereof. In one example, the first device 502 and the second device 504 may be clients, such as any combination of clients 304 to 310 shown in FIG. 3. In another example, the first device 502 may be a client, such as one of clients 304 to 310 shown in FIG. 3, and the second device 504 may not be a client, such as a device that is calling into a conferencing service of the software platform. The user of the first device 502 may move to a location within the customer premises that contains the third device 506. The user may wish to automatically handover the session in progress 512 from the first device 502 to the third device 506 upon entering the location where the third device 506 is located.

The third device 506 may transmit a non-penetrating signal, such as a short range signal. The short range signal may be transmitted periodically at a time interval or continuously. In an example of a vehicle, the transmission of the short range signal may be terminated if it is detected that the vehicle is in motion. Termination of the short range signal is only associated with the ability of the mobile device to connect to the conferencing device. The mobile device will not disconnect from the conferencing device when the short range signal transmission is terminated. The short range signal may be transmitted based on a detection of the first device 502. For example, the software platform may track the first device 502 using GPS to detect that the first device 502 has entered a room, such as a conference room, in which the third device 506 is located. Based on the detection that the first device 502 has entered the room, the third device 506 may transmit the short range signal. The short range signal may be a non-penetrating signal such that it does not penetrate through walls or glass and is generally contained within a room, for example, a conference room at a customer premises. The short range signal may be expressed as an encoded string that may be mapped to some device information. For example, the short range signal may include a frequency signature of the third device 506, such as, for example, a device identification (ID). The frequency signature of the third device 506 may be used when opening a communication channel. For example, by mapping the frequency signature of the third device 506 to the second device 504, the second device 504 is granted access to communicate over the communication channel. The short range signal may include some encoded data that is usable to determine other information such as a device type, a device location (i.e., room name), a device model, a device address, or any combination thereof, by using a defined mapping. In some examples, the non-penetrating signal may be an IR signal, a UWB signal, an NFC signal, a DSRC signal, or an ultrasonic signal, and may be transmitted by the third device 506 in conjunction with or instead of the short range signal.

The first device 502 may activate a component, such as, for example, a short range signal receiver or a microphone, based on sensor data to monitor for a non-penetrating signal, such as the short range signal. For example, sensors such as an accelerometer or a GPS may detect motion or a change in location of the first device 502 to activate the component. The motion detection may be based on a threshold, for example, to avoid activating the component based on a false positive motion such as a user checking the first device 502 for the time or a notification. For example, the threshold may be based on a number of steps the user takes or a distance from the location where an initial motion was detected in order to activate the component. The distance for the threshold may be based on the size of the room the user was in when the initial motion was detected. For example, if the distance from the location where an initial motion was detected is greater than a maximum distance that a user can move in the room, the system may determine that the user has left the room and activate the component. The component may be activated based on a determination of a session in progress, sensor data, or both. In an example, the user may have a session in progress on the first device 502 and decide to move to a conference room. The first device 502 may detect that the user is in motion and activate one or more components. Upon entering the location where the third device 506 is located, the first device 502 may detect 514 the short range signal. In response to detecting the short range signal, the first device 502 may transmit a request to the server 508.

The request may be transmitted based on a threshold duration of time that the short range signal is detected to avoid performing an unintended handover. For example, if the short range signal is detected for a duration of time that is less than the threshold duration of time, the system may determine that the user did not enter the room that the third device 506 is located. If the short range signal is detected for a duration of time that is equal to or greater than the threshold duration of time, the system may determine that the user entered the room that the third device 506 is located. In an example of a vehicle, the request may be transmitted on a condition that the vehicle is stationary. In another example, the request may be transmitted based on a user-defined or employer-defined configuration. For example, if it is a company vehicle, the request may be transmitted based on a confirmation that the first device is a company device.

The request may be to perform a handover of one or more components of the session in progress from the first device 502 to the third device 506, for example, an audio component or a video component. In an example, the request may be transmitted based on a vehicle motion status. For example, if the vehicle motion status indicates that the vehicle is in motion, the request may be to perform a handover of the audio component of the session in progress. If the vehicle motion status indicates that the vehicle is stationary, the request may be to perform a handover of the audio component of the session in progress, the video component of the session in progress, or both. In some examples, the user may be prompted on the first device 502 to confirm that a handover of the session in progress 512 to the third device 506 is desired before the request is transmitted. If the first device 502 does not detect the short range signal, the first device may receive 516 a sharing key via a user input and transmit the request to the server 508. The sharing key may be a secure code to associate the first device 502 and the third device 506.

The server 508 may transmit device information 518 to the first device 502. The device information is associated with the third device 506 and may include a device ID, a device type, a device location (i.e., room name), a device model, a device address, or any combination thereof. The first device 502 may use the device information 518 to initiate 520 the handover by generating a handover request that includes the device information 518. Initiating the handover may include transmitting the handover request to the PBX server 510 to perform a handover of the session in progress 512, or a component thereof, from the first device 502 to the third device 506 using the device information 518. In some examples, the first device 502 may deactivate the component after initiating the handover.

In response to receiving the handover request, the PBX server 510 may transmit information associated with the first device 502, the session in progress 512, or both, to the third device 506 to facilitate the handover. The PBX server 510 may open a communication channel between the second device 504 and the third device 506. In an example where a component of the session in progress is being transferred, such as the audio component of the session in progress, an audio channel is opened between the second device 504 and the third device 506 via the PBX server 510 without a corresponding video channel being opened between the second device 504 and the third device 506. Opening the communication channel may include mapping the frequency signature to the third device 506. The PBX server 510 may transfer the session in progress 512, or a component thereof, from the first device 502 to the third device 506 over the communication channel such that the user may continue 522 the session in progress between the second device 504 and the third device 506 without interruption. In an example where a component of the session in progress is transferred, such as the audio component of the session in progress, the audio component is continued over the audio channel between the second device 504 and the third device 506 via the PBX server 510. The PBX server 510 may then transmit a termination signal to the first device 502, the second device 504, or both to terminate the session in progress 512. In an example where a vehicle is in motion, an audio component of the session in progress may be continued on the third device 506 while a video component is terminated. In an example where the vehicle is stationary, the audio component of the session in progress, the video component of the session in progress, or both, may be continued on the third device 506.

Figure 6:
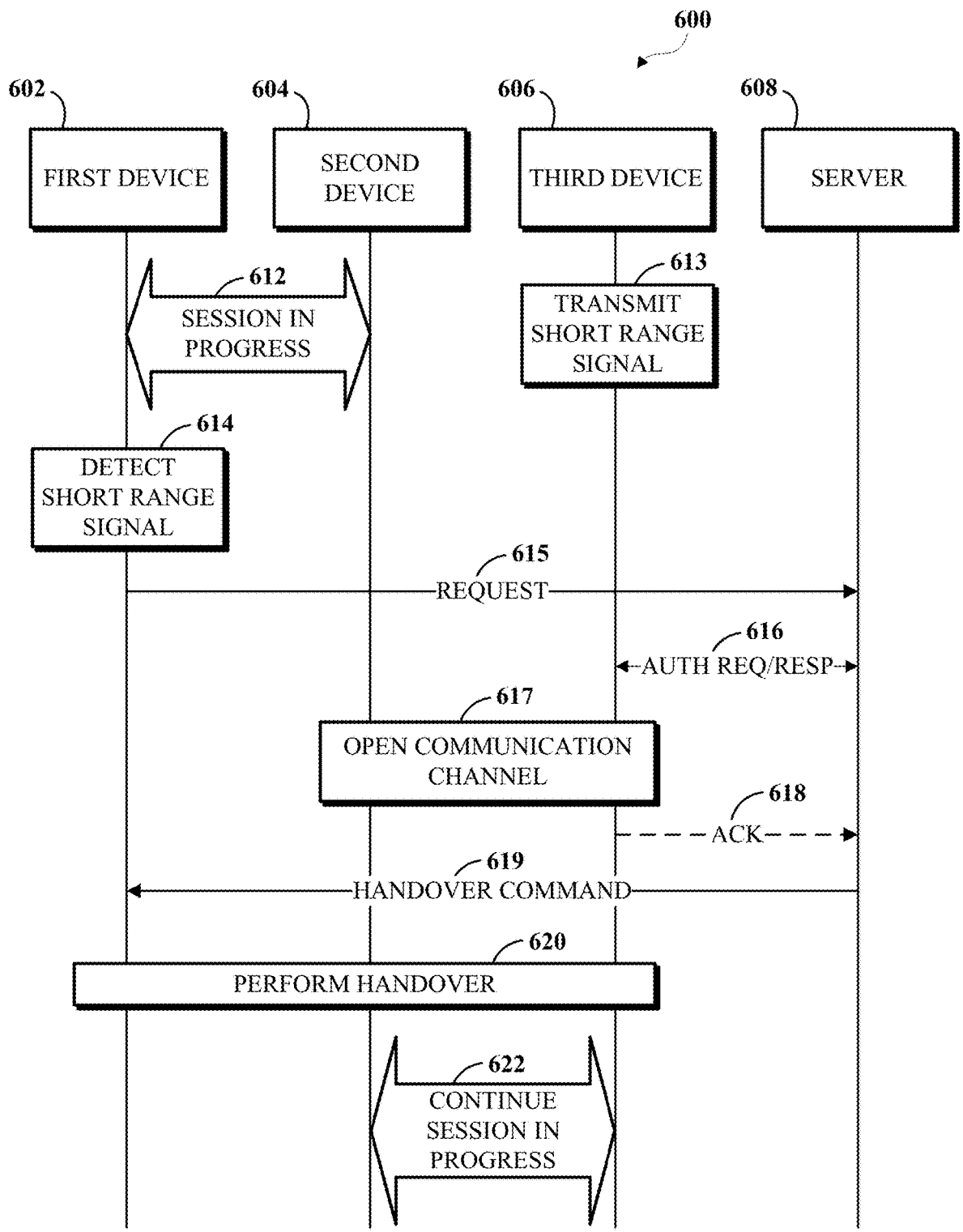
FIG. 6 is a swim lane diagram of another example of a system performing a proximity-based session handover.

FIG. 6 is a swim lane diagram of another example of a system 600 performing a proximity-based session handover. The system 600 includes a first device 602, a second device 604, a third device 606, and a server 608. In this example, the first device 602 may be a mobile device such as a mobile phone, a tablet computing device, a laptop computer, or another mobile device. The second device 604 may be a mobile device or a stationary device, such as a mobile phone, a tablet computing device, a laptop computer, a desktop computer, a desk phone, a room appliance, a video conferencing system, a teleconferencing system, or another mobile or stationary device. The third device 606 may be a stationary device, such as a desk phone, a room appliance, a video conferencing system, a teleconferencing system, an infotainment device of a vehicle such as an automobile, a conferencing device for use in a vehicle, or another stationary device.

The first device 602 may have a session in progress 612 with the second device 604. The session in progress 612 may be an interaction such as a video or audio conference, an email messaging session, a chat or instant messaging session, or any combination thereof. In one example, the first device 602 and the second device 604 may be clients, such as any combination of clients 304 to 310 shown in FIG. 3. In another example, the first device 602 may be a client, such as one of clients 304 to 310 shown in FIG. 3, and the second device 604 may not be a client, such as a device that is calling into a conferencing service of the software platform. The user of the first device 602 may move to a location within the customer premises or to a vehicle that contains the third device 606. The user may wish to automatically handover the session in progress 612 from the first device 602 to the third device 606 upon entering the location where the third device 606 is located.

The third device 606 may transmit 613 a non-penetrating signal, such as a short range signal. The short range signal may be transmitted periodically at a time interval or continuously. In an example of a vehicle, the transmission of the short range signal may be terminated based on a detection that the vehicle is in motion. Termination of the short range signal is only associated with the ability of the mobile device to connect to the conferencing device. The mobile device will not disconnect from the conferencing device when the short range signal transmission is terminated. The short range signal may be transmitted based on a detection of the first device 502. For example, the software platform may track the first device 502 using GPS to detect that the first device 502 has entered a room, such as a conference room, or a vehicle, in which the third device 506 is located. Based on the detection that the first device 502 has entered the room or vehicle, the third device 506 may transmit the short range signal. The short range signal may be a non-penetrating signal such that it does not penetrate through walls or glass and is generally contained within a room, for example, a conference room at a customer premises. The short range signal may be expressed as an encoded string that may be mapped to some device information. For example, the short range signal may include a frequency signature of the third device 606, such as, for example, a device ID. The short range signal may include some encoded data that is usable to determine other information such as a device type, a device location (i.e., room name), a device model, a device address, or any combination thereof, by using a defined mapping. In some examples, the non-penetrating signal may be an IR signal, a UWB signal, an NFC signal, or an ultrasonic signal, and may be transmitted by the third device 606 in conjunction with or instead of the short range signal.

The first device 602 may activate a component, such as, for example, a short range signal receiver or a microphone, based on sensor data to monitor for a non-penetrating signal, such as the short range signal. For example, sensors such as an accelerometer or a GPS may detect motion or a change in location of the first device 602 to activate the component. The motion detection may be based on a threshold, for example, to avoid activating the component based on a false positive motion such as a user checking the first device 602 for the time or a notification. For example, the threshold may be based on a number of steps the user takes or a distance from the location where an initial motion was detected in order to activate the component. The distance for the threshold may be based on the size of the room the user was in when the initial motion was detected. For example, if the distance from the location where an initial motion was detected is greater than a maximum distance that a user can move in the room, the system may determine that the user has left the room and activate the component. The component may be activated based on a determination of a session in progress, sensor data, or both. In an example, the user may have a session in progress on the first device 602 and decide to move to a conference room. The first device 602 may detect that the user is in motion and activate one or more components. Upon entering the location where the third device 606 is located, the first device 602 may detect 614 the short range signal. In response to detecting the short range signal, the first device 602 may transmit a request 615 to the server 608.

The request 615 may be transmitted based on a threshold duration of time that the short range signal is detected to avoid performing an unintended handover. For example, if the short range signal is detected for a duration of time that is less than the threshold duration of time, the system may determine that the user did not enter the room that the third device 606 is located. If the short range signal is detected for a duration of time that is equal to or greater than the threshold duration of time, the system may determine that the user entered the room that the third device 606 is located. In an example of a vehicle, the request 615 may be transmitted on a condition that the vehicle is stationary. In another example, the request 615 may be transmitted based on a user-defined or employer-defined configuration. For example, if it is a company vehicle, the request 615 may be transmitted based on a confirmation that the first device 602 is a company device.

The request 615 may be a request to perform a handover of one or more components of the session in progress 612, such as an audio component or a video component, from the first device 602 to the third device 606. In an example, the request may be transmitted based on a vehicle motion status. For example, if the vehicle motion status indicates that the vehicle is in motion, the request 615 may be to perform a handover of the audio component of the session in progress. If the vehicle motion status indicates that the vehicle is stationary, the request 615 may be to perform a handover of the audio component of the session in progress, the video component of the session in progress, or both. In some examples, the user may be prompted on the first device 602 to confirm that a handover of the session in progress 612, or a component thereof, to the third device 606 is desired before the request 615 is transmitted. If the first device 602 does not detect the short range signal, the first device may receive a sharing key via a user input and transmit the request 615 to the server 608. The sharing key may be a secure code to associate the first device 602 and the third device 606.

If the first device 602 is not pre-authorized, the server 508 may perform an authentication with the third device 606 by transmitting/receiving an authentication request/response 616. The authentication request may include device information of the first device 602. The device information may include a device ID, a device type, a device location (i.e., room name), a device model, a device address, or any combination thereof. The third device 606 may use the device information for the handover. Upon completion of the authentication, the server 608 may initiate the handover by opening 617 a communication channel between the second device 604 and the third device 606. Opening the communication channel may include mapping the frequency signature to the third device 606. If the first device 602 is pre-authorized, the authentication step may be eliminated, and the server 608 may initiate the handover by opening 617 the communication channel between the second device 604 and the third device 606. In some examples, the first device 602 may deactivate the detector after initiating the handover. In some examples, the third device 606 may transmit an acknowledgement 618 to the server 608 that indicates that the communication channel between the second device 604 and the third device 606 is open.

In this example, the server 608 transmits a handover command 619 to the first device 602. The handover command 619 may include information associated with the third device 606, the session in progress 612, or both, to facilitate the handover. The handover is performed 620 such that the session in progress 612, or a component thereof, is transferred from the first device 602 to the third device 606 over the communication channel such that the user may continue 622 the session in progress between the second device 604 and the third device 606 without interruption. In an example where a vehicle is in motion, an audio component of the session in progress may be transferred the third device 606 while a video component of the session in progress is terminated. In an example where the vehicle is in motion, an audio component of the session in progress may be transferred to the third device 606 while a video component is terminated. In an example where the vehicle is stationary, the audio component of the session in progress, the video component of the session in progress, or both, may be transferred to the third device 606. Upon successful handover to the third device 606, the first device 602, the second device 604, or both, may terminate the session in progress 612. In some examples, the first device 602, the second device 604, or both, may transmit a termination signal based on an expiration of a timer. In some examples, the timer may be based on a duration of time where the first device 602 detects motion or not. For example, if the first device 602 is determined to remain in the room after the expiration of the timer, the termination signal may be transmitted. If the first device 602 is determined to have left the room based on detected motion prior to the expiration of the timer, the termination signal may not be transmitted so that the user may resume the session on the first device 602.

In some examples, the first device 602 may be configured to detect a sensor input during the session in progress 622 between the second device 604 and the third device 606. The sensor input may include accelerometer data, GPS data, or a button press on the first device 602. In an example, the sensor input may include detecting motion of the first device 602, using GPS data to determine that the first device 602 has entered a vehicle, or any other sensor input that indicates the intent of the user of the first device 602 to transfer the session in progress 622. In response to detecting the sensor input, a monitor may be initiated to detect the non-penetrating signal. If the non-penetrating signal is not detected, a handover of the session in progress 622 to the first device may be performed. The handover to the first device 602 may be performed when a duration of time of not detecting the non-penetrating signal exceeds a predetermined duration of time.

Figure 7:
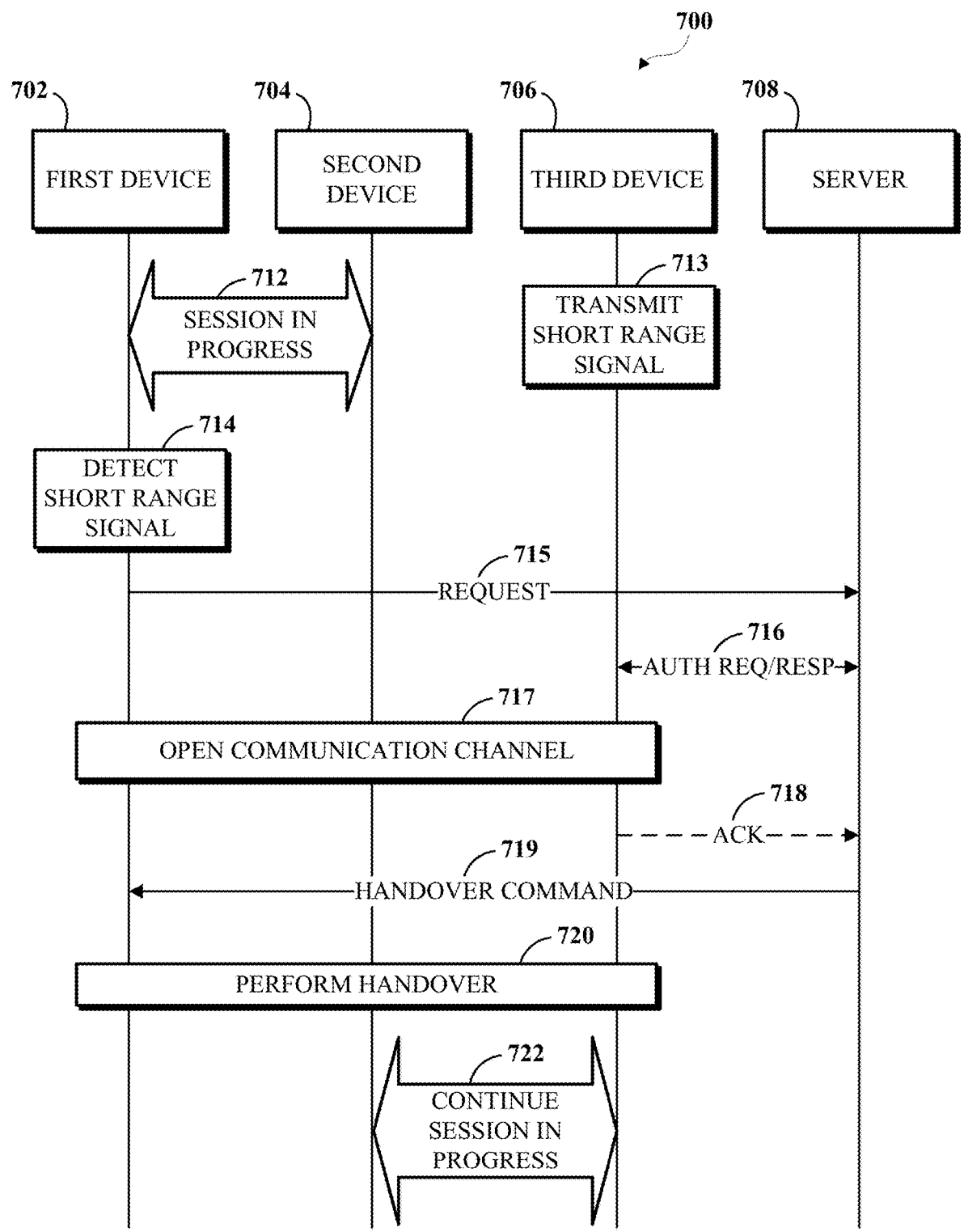
FIG. 7 is a swim lane diagram of another example of a system performing a proximity-based session handover.

FIG. 7 is a swim lane diagram of another example of a system 700 performing a proximity-based session handover. The system 700 includes a first device 702, a second device 704, a third device 706, and a server 708. In this example, the first device 702 may be a mobile device such as a mobile phone, a tablet computing device, a laptop computer, or another mobile device. The second device 704 may be a mobile device or a stationary device, such as a mobile phone, a tablet computing device, a laptop computer, a desktop computer, a desk phone, a room appliance, a video conferencing system, a teleconferencing system, or another mobile or stationary device. The third device 706 may be a stationary device, such as a desk phone, a room appliance, a video conferencing system, a teleconferencing system, an infotainment device of a vehicle such as an automobile, a conferencing device for use in a vehicle, or another mobile or stationary device.

The first device 702 may have a session in progress 712 with the second device 704. The session in progress 712 may be an interaction such as a video or audio conference, an email messaging session, a chat or instant messaging session, or any combination thereof. In one example, the first device 702 and the second device 704 may be clients, such as any combination of clients 304 to 310 shown in FIG. 3. In another example, the first device 702 may be a client, such as one of clients 304 to 310 shown in FIG. 3, and the second device 704 may not be a client, such as a device that is calling into a conferencing service of the software platform. The user of the first device 702 may move to a location within the customer premises, or to a vehicle, that contains the third device 706. The user may wish to automatically handover the session in progress 712 from the first device 702 to the third device 706 upon entering the location where the third device 706 is located.

The third device 706 may transmit 713 a non-penetrating signal, such as a short range signal. The short range signal may be transmitted periodically at a time interval or continuously. In an example of a vehicle, the transmission of the short range signal may be terminated based on a detection that the vehicle is in motion. Termination of the short range signal is only associated with the ability of the mobile device to connect to the conferencing device. The mobile device will not disconnect from the conferencing device when the short range signal transmission is terminated. The short range signal may be transmitted based on a detection of the first device 702. For example, the software platform may track the first device 702 using GPS to detect that the first device 702 has entered a room, such as a conference room, in which the third device 706 is located. Based on the detection that the first device 702 has entered the room, the third device 706 may transmit the short range signal. The short range signal may be a non-penetrating signal such that it does not penetrate through walls or glass and is generally contained within a room, for example, a conference room at a customer premises. The short range signal may be expressed as an encoded string that may be mapped to some device information. For example, the short range signal may include a frequency signature of the third device 706, such as, for example, a device ID. The short range signal may include some encoded data that is usable to determine other information such as a device type, a device location (i.e., room name), a device model, a device address, or any combination thereof, by using a defined mapping. In some examples, the non-penetrating signal may be an IR signal, a UWB signal, an NFC signal, or an ultrasonic signal, and may be transmitted by the third device 706 in conjunction with or instead of the short range signal.

The first device 702 may activate a component, such as, for example, a short range signal receiver or a microphone, based on sensor data to monitor for a non-penetrating signal, such as the short range signal. For example, sensors such as an accelerometer or a GPS may detect motion or a change in location of the first device 702 to activate the component. The motion detection may be based on a threshold, for example, to avoid activating the component based on a false positive motion such as a user checking the first device 702 for the time or a notification. For example, the threshold may be based on a number of steps the user takes or a distance from the location where an initial motion was detected in order to activate the component. The distance for the threshold may be based on the size of the room the user was in when the initial motion was detected. For example, if the distance from the location where an initial motion was detected is greater than a maximum distance that a user can move in the room, the system may determine that the user has left the room and activate the component. The component may be activated based on a determination of a session in progress, sensor data, or both. In an example, the user may have a session in progress on the first device 702 and decide to move to a conference room. The first device 702 may detect that the user is in motion and activate one or more components. Upon entering the location where the third device 706 is located, the first device 702 may detect 714 the short range signal. In response to detecting the short range signal, the first device 702 may transmit a request 715 to the server 708.

The request 715 may be transmitted based on a threshold duration of time that the short range signal is detected to avoid performing an unintended handover. For example, if the short range signal is detected for a duration of time that is less than the threshold duration of time, the system may determine that the user did not enter the room that the third device 706 is located. If the short range signal is detected for a duration of time that is equal to or greater than the threshold duration of time, the system may determine that the user entered the room that the third device 706 is located. In an example of a vehicle, the request 715 may be transmitted based on a determination that the vehicle is stationary. In another example, the request 715 may be transmitted based on a user-defined or employer-defined configuration. For example, if it is a company vehicle, the request 715 may be transmitted based on a confirmation that the first device 702 is a company device.

The request 715 may be a request to perform a handover of one or more components of the session in progress 712, such as an audio component or a video component, from the first device 702 to the third device 706. In an example, the request 715 may be transmitted based on a vehicle motion status. For example, if the vehicle motion status indicates that the vehicle is in motion, the request 715 may be to perform a handover of the audio component of the session in progress. If the vehicle motion status indicates that the vehicle is stationary, the request 715 may be to perform a handover of the audio component of the session in progress, the video component of the session in progress, or both. In some examples, the user may be prompted on the first device 702 to confirm that a handover of the session in progress 712, or a component thereof, to the third device 706 is desired before the request 715 is transmitted. If the first device 702 does not detect the short range signal, the first device may receive a sharing key via a user input and transmit the request 715 to the server 708. The sharing key may be a secure code to associate the first device 702 and the third device 706.

If the first device 702 is not pre-authorized, the server 708 may perform an authentication with the third device 706 by transmitting/receiving an authentication request/response 716. The authentication request may include device information of the first device 702. The device information may include a device ID, a device type, a device location (i.e., room name), a device model, a device address, or any combination thereof. The third device 706 may use the device information for the handover. Upon completion of the authentication, the server 708 may initiate the handover by opening 717 a communication channel between the first device 702, the second device 704, and the third device 706. Opening the communication channel may include mapping the frequency signature to the third device 706. If the first device 702 is pre-authorized, the authentication step may be eliminated, and the server 708 may initiate the handover by opening 717 the communication channel between the first device 702, the second device 704, and the third device 706. In some examples, the first device 702 may deactivate the detector after initiating the handover. In some examples, the third device 706 may transmit an acknowledgement 718 to the server 708 that indicates that the communication channel between the first device 702, the second device 704, and the third device 706 is open.

In this example, the server 708 transmits a handover command 719 to the first device 702. The handover command 719 may include information associated with the third device 706, the session in progress 712, or both, to facilitate the handover. The handover is performed 720 such that the session in progress 712, or a component thereof, is transferred from the first device 702 to the third device 706 over the communication channel such that the user may continue 722 the session in progress, or a component thereof, between the second device 704 and the third device 706 without interruption. In an example where a vehicle is in motion, an audio component of the session in progress may be transferred the third device 706 while a video component of the session in progress is terminated. In an example where the vehicle is stationary, the audio component of the session in progress, the video component of the session in progress, or both, may be transferred the third device 706. Upon successful handover to the third device 706, the first device 702, the second device 704, or both, may terminate the session in progress 712. In some examples, the first device 702, the second device 704, or both, may transmit a termination signal based on an expiration of a timer. In some examples, the timer may be based on a duration of time where the first device 702 detects motion or not. For example, if the first device 702 is determined to remain in the room after the expiration of the timer, the termination signal may be transmitted. If the first device 702 is determined to have left the room based on detected motion prior to the expiration of the timer, the termination signal may not be transmitted so that the user may resume the session on the first device 702.

In some examples, the first device 702 may be configured to detect a sensor input during the session in progress 722 between the second device 604 and the third device 706. The sensor input may include accelerometer data, GPS data, or a button press on the first device 702. In an example, the sensor input may include detecting motion of the first device 702, using GPS data to determine that the first device 702 has entered a vehicle, or any other sensor input that indicates the intent of the user of the first device 702 to transfer the session in progress 722. In response to detecting the sensor input, a monitor may be initiated to detect the non-penetrating signal. If the non-penetrating signal is not detected, a handover of the session in progress 722 to the first device may be performed. The handover to the first device 702 may be performed when a duration of time of not detecting the non-penetrating signal exceeds a predetermined duration of time.

Figure 8:
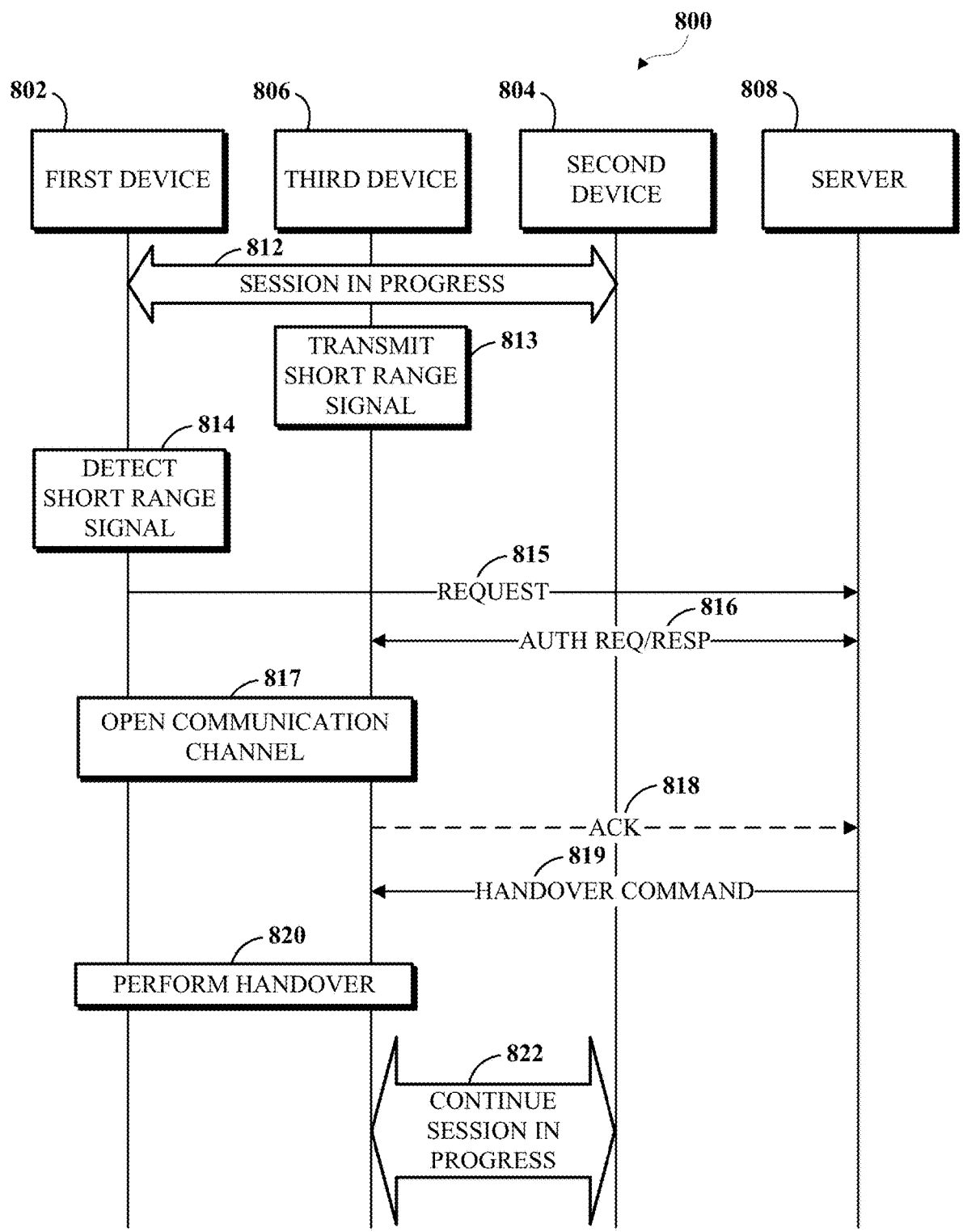
FIG. 8 is a swim lane diagram of another example of a system performing a proximity-based session handover.

FIG. 8 is a swim lane diagram of another example of a system 800 performing a proximity-based session handover. The system 800 includes a first device 802, a second device 804, a third device 806, and a server 808. In this example, the first device 802 may be a mobile device such as a mobile phone, a tablet computing device, a laptop computer, or another mobile device. The second device 804 may be a mobile device or a stationary device, such as a mobile phone, a tablet computing device, a laptop computer, a desktop computer, a desk phone, a room appliance, a video conferencing system, a teleconferencing system, or another mobile or stationary device. The third device 806 may be a stationary device, such as a desk phone, a room appliance, a video conferencing system, a teleconferencing system, an infotainment device of a vehicle such as an automobile, a conferencing device for use in a vehicle, or another mobile or stationary device.

The first device 802 may have a session in progress 812 with the second device 804. The session in progress 812 may be an interaction such as a video or audio conference, an email messaging session, a chat or instant messaging session, or any combination thereof. In one example, the first device 802 and the second device 804 may be clients, such as any combination of clients 304 to 310 shown in FIG. 3. In another example, the first device 802 may be a client, such as one of clients 304 to 310 shown in FIG. 3, and the second device 804 may not be a client, such as a device that is calling into a conferencing service of the software platform. The user of the first device 802 may move to a location within the customer premises, or to a vehicle, that contains the third device 806. The user may wish to automatically handover the session in progress 812, or a component thereof, from the first device 802 to the third device 806 upon entering the location where the third device 806 is located.

The third device 806 may transmit 813 a non-penetrating signal, such as a short range signal. The short range signal may be transmitted periodically at a time interval or continuously. In an example of a vehicle, the transmission of the short range signal may be terminated based on a detection that the vehicle is in motion. Termination of the short range signal is only associated with the ability of the mobile device to connect to the conferencing device. The mobile device will not disconnect from the conferencing device when the short range signal transmission is terminated. The short range signal may be transmitted based on a detection of the first device 802. For example, the software platform may track the first device 802 using GPS to detect that the first device 802 has entered a room, such as a conference room, in which the third device 806 is located. Based on the detection that the first device 802 has entered the room, the third device 806 may transmit the short range signal. The short range signal may be a non-penetrating signal such that it does not penetrate through walls or glass and is generally contained within a room, for example, a conference room at a customer premises. The short range signal may be expressed as an encoded string that may be mapped to some device information. For example, the short range signal may include a frequency signature of the third device 806, such as, for example, a device ID. The short range signal may include some encoded data that is usable to determine other information such as a device type, a device location (i.e., room name), a device model, a device address, or any combination thereof, by using a defined mapping. In some examples, the non-penetrating signal may be an IR signal, a UWB signal, an NFC signal, a DSRC signal, or an ultrasonic signal, and may be transmitted by the third device 806 in conjunction with or instead of the short range signal.

The first device 802 may activate a component, such as, for example, a short range signal receiver or a microphone, based on sensor data to monitor for a non-penetrating signal, such as the short range signal. For example, sensors such as an accelerometer or a GPS may detect motion or a change in location of the first device 802 to activate the component. The motion detection may be based on a threshold, for example, to avoid activating the component based on a false positive motion such as a user checking the first device 802 for the time or a notification. For example, the threshold may be based on a number of steps the user takes or a distance from the location where an initial motion was detected in order to activate the component. The distance for the threshold may be based on the size of the room the user was in when the initial motion was detected. For example, if the distance from the location where an initial motion was detected is greater than a maximum distance that a user can move in the room, the system may determine that the user has left the room and activate the component. The component may be activated based on a determination of a session in progress, sensor data, or both. In an example, the user may have a session in progress on the first device 802 and decide to move to a conference room. The first device 802 may detect that the user is in motion and activate one or more components. Upon entering the location where the third device 806 is located, the first device 802 may detect 814 the short range signal. In response to detecting the short range signal, the first device 802 may transmit a request 815 to the server 808.

The request 815 may be transmitted based on a threshold duration of time that the short range signal is detected to avoid performing an unintended handover. For example, if the short range signal is detected for a duration of time that is less than the threshold duration of time, the system may determine that the user did not enter the room that the third device 806 is located. If the short range signal is detected for a duration of time that is equal to or greater than the threshold duration of time, the system may determine that the user entered the room that the third device 806 is located. In an example of a vehicle, the request 815 may be transmitted on a condition that the vehicle is stationary. In another example, the request 815 may be transmitted based on a user-defined or employer-defined configuration. For example, if it is a company vehicle, the request 815 may be transmitted based on a confirmation that the first device 802 is a company device.

The request 815 may be a request to perform a handover of one or more components of the session in progress 812, such as an audio component or a video component, from the first device 802 to the third device 806. In an example, the request 815 may be transmitted based on a vehicle motion status. For example, if the vehicle motion status indicates that the vehicle is in motion, the request 815 may be to perform a handover of the audio component of the session in progress. If the vehicle motion status indicates that the vehicle is stationary, the request 815 may be to perform a handover of the audio component of the session in progress, the video component of the session in progress, or both. In some examples, the user may be prompted on the first device 802 to confirm that a handover of the session in progress 812, or a component thereof, to the third device 806 is desired before the request 815 is transmitted. If the first device 802 does not detect the short range signal, the first device may receive a sharing key via a user input and transmit the request 815 to the server 808. The sharing key may be a secure code to associate the first device 802 and the third device 806.

If the first device 802 is not pre-authorized, the server 808 may perform an authentication with the third device 806 by transmitting/receiving an authentication request/response 816. The authentication request may include device information of the first device 802. The device information may include a device ID, a device type, a device location (i.e., room name), a device model, a device address, or any combination thereof. The third device 806 may use the device information for the handover. Upon completion of the authentication, the server 808 may initiate the handover by opening 817 a communication channel between the first device 802 and the third device 806. Opening the communication channel may include mapping the frequency signature of the third device 806 to the first device 802. The frequency signature of the third device 806 may be used when opening a communication channel. For example, by mapping the frequency signature of the third device 806 to the first device 802, the first device 802 is granted access to communicate over the communication channel. In some examples, the third device 806 may transmit an acknowledgement 818 to the server 808 that indicates that the communication channel between the first device 802 and the third device 806 is open.

In this example, the server 808 transmits a handover command 819 to the third device 806. The handover command 819 may include information associated with the first device 802, the second device 804, the session in progress 812, or any combination thereof, to facilitate the handover. The handover is performed 820 such that the session in progress 812, or a component thereof, is transferred from the first device 802 to the third device 806 over the communication channel such that the user may continue 822 the session in progress between the second device 804 and the third device 806 without interruption. In some examples, performing 820 the handover may include opening a communication channel between the second device 804 and the third device 806, and transferring the session in progress 812 over this communication channel. In an example where a vehicle is in motion, an audio component of the session in progress may be transferred the third device 806 while a video component of the session in progress is terminated. In an example where the vehicle is stationary, the audio component of the session in progress, the video component of the session in progress, or both, may be transferred the third device 806. Upon successful handover to the third device 806, the first device 802, the second device 804, or both, may terminate the session in progress 812. In some examples, the first device 802, the second device 804, or both, may transmit a termination signal based on an expiration of a timer. In some examples, the timer may be based on a duration of time where the first device 802 detects motion or not. For example, if the first device 802 is determined to remain in the room after the expiration of the timer, the termination signal may be transmitted. If the first device 802 is determined to have left the room based on detected motion prior to the expiration of the timer, the termination signal may not be transmitted so that the user may resume the session on the first device 802.

In some examples, the first device 802 may be configured to detect a sensor input during the session in progress 822 between the second device 804 and the third device 806. The sensor input may include accelerometer data or GPS data, or a button press on the first device 802. In an example, the sensor input may include detecting motion of the first device 802, using GPS data to determine that the first device 802 has entered a vehicle, or any other sensor input that indicates the intent of the user of the first device 802 to transfer the session in progress 822. In response to detecting the sensor input, a monitor may be initiated to detect the non-penetrating signal. If the non-penetrating signal is not detected, a handover of the session in progress 822 to the first device may be performed. The handover to the first device 802 may be performed when a duration of time of not detecting the non-penetrating signal exceeds a predetermined duration of time.

Figure 9:
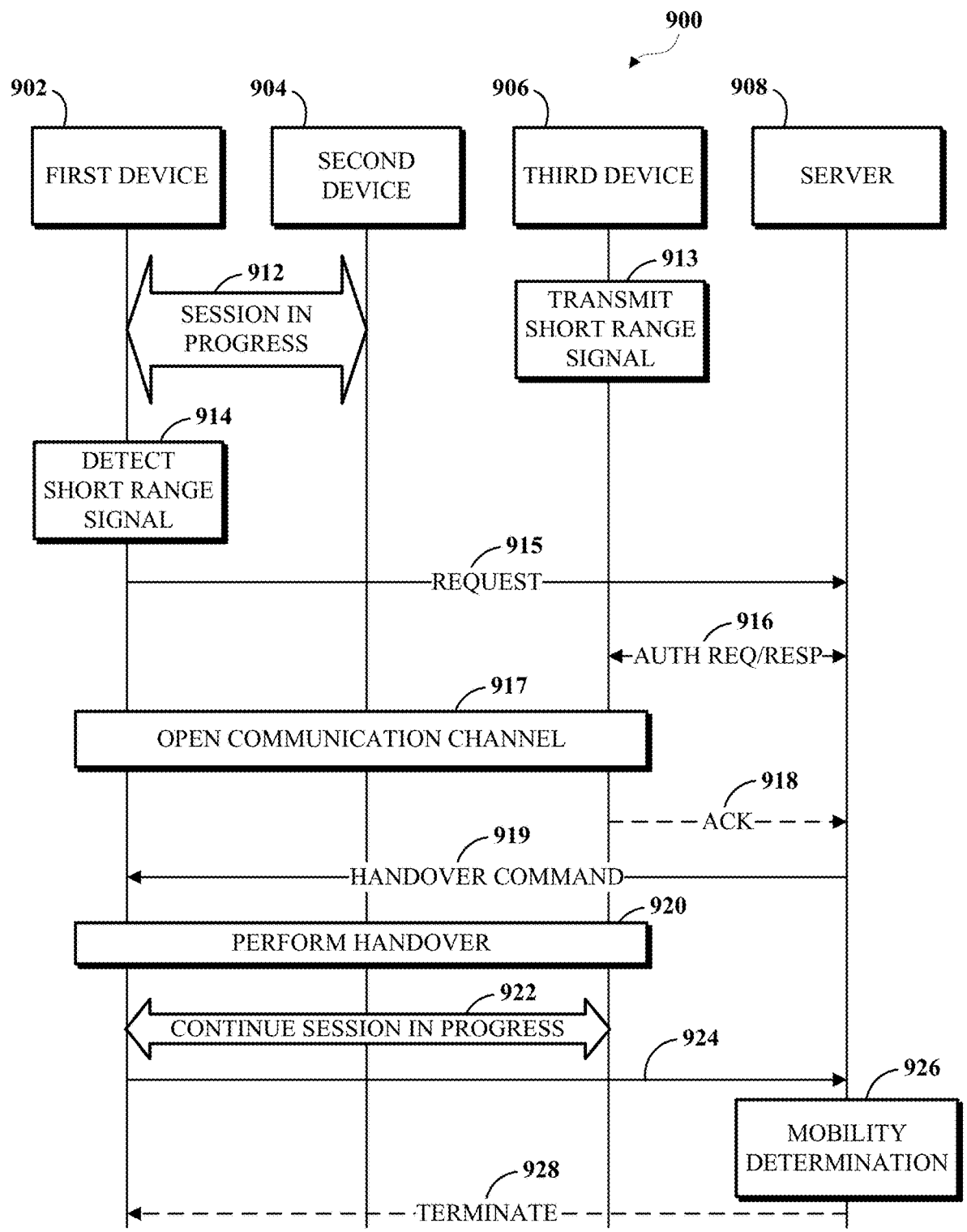
FIG. 9 is a swim lane diagram of another example of a system performing a proximity-based session handover.

FIG. 9 is a swim lane diagram of another example of a system 900 performing a proximity-based session handover. The system 900 includes a first device 902, a second device 904, a third device 906, and a server 908. In this example, the first device 902 may be a mobile device such as a mobile phone, a tablet computing device, a laptop computer, or another mobile device. The second device 904 may be a mobile device or a stationary device, such as a mobile phone, a tablet computing device, a laptop computer, a desktop computer, a desk phone, a room appliance, a video conferencing system, a teleconferencing system, or another mobile or stationary device. The third device 906 may be a stationary device, such as a desk phone, a room appliance, a video conferencing system, a teleconferencing system, an infotainment device of a vehicle such as an automobile, a conferencing device for use in a vehicle, or another mobile or stationary device.

The first device 902 may have a session in progress 912 with the second device 904. The session in progress 912 may be an interaction such as a video or audio conference, an email messaging session, a chat or instant messaging session, or any combination thereof. In one example, the first device 902 and the second device 804 may be clients, such as any combination of clients 304 to 310 shown in FIG. 3. In another example, the first device 902 may be a client, such as one of clients 304 to 310 shown in FIG. 3, and the second device 904 may not be a client, such as a device that is calling into a conferencing service of the software platform. The user of the first device 902 may move to a location within the customer premises, or to a vehicle, that contains the third device 906. The user may wish to automatically handover the session in progress 912, or a component thereof, from the first device 902 to the third device 906 upon entering the location where the third device 906 is located.

The third device 906 may transmit 913 a non-penetrating signal, such as a short range signal. The short range signal may be transmitted periodically at a time interval or continuously. In an example of a vehicle, the short range signal transmission may be terminated based on a detection that the vehicle is in motion. Termination of the short range signal is only associated with the ability of the mobile device to connect to the conferencing device. The mobile device will not disconnect from the conferencing device when the short range signal transmission is terminated. The short range signal may be transmitted based on a detection of the first device 902. For example, the software platform may track the first device 902 using GPS to detect that the first device 902 has entered a room, such as a conference room, in which the third device 906 is located. Based on the detection that the first device 902 has entered the room, the third device 906 may transmit the short range signal. The short range signal may be a non-penetrating signal such that it does not penetrate through walls or glass and is generally contained within a room, for example, a conference room at a customer premises. The short range signal may be expressed as an encoded string that may be mapped to some device information. For example, the short range signal may include a frequency signature of the third device 906, such as, for example, a device ID. The short range signal may include some encoded data that is usable to determine other information such as a device type, a device location (i.e., room name), a device model, a device address, or any combination thereof, by using a defined mapping. In some examples, the non-penetrating signal may be an IR signal, a UWB signal, an NFC signal, or an ultrasonic signal, and may be transmitted by the third device 906 in conjunction with or instead of the short range signal.

The first device 902 may activate a component, such as, for example, a short range signal receiver or a microphone, based on sensor data to monitor for a non-penetrating signal, such as the short range signal. For example, sensors such as an accelerometer or a GPS may detect motion or a change in location of the first device 902 to activate the component. The motion detection may be based on a threshold, for example, to avoid activating the component based on a false positive motion such as a user checking the first device 902 for the time or a notification. For example, the threshold may be based on a number of steps the user takes or a distance from the location where an initial motion was detected in order to activate the component. The distance for the threshold may be based on the size of the room the user was in when the initial motion was detected. For example, if the distance from the location where an initial motion was detected is greater than a maximum distance that a user can move in the room, the system may determine that the user has left the room and activate the component. The component may be activated based on a determination of a session in progress, sensor data, or both. In an example, the user may have a session in progress on the first device 902 and decide to move to a conference room. The first device 902 may detect that the user is in motion and activate one or more components. Upon entering the location where the third device 906 is located, the first device 902 may detect 914 the short range signal. In response to detecting the short range signal, the first device 902 may transmit a request 915 to the server 908.

The request 915 may be transmitted based on a threshold duration of time that the short range signal is detected to avoid performing an unintended handover. For example, if the short range signal is detected for a duration of time that is less than the threshold duration of time, the system may determine that the user did not enter the room that the third device 906 is located. If the short range signal is detected for a duration of time that is equal to or greater than the threshold duration of time, the system may determine that the user entered the room that the third device 906 is located. In an example of a vehicle, the request 915 may be transmitted on a condition that the vehicle is stationary. In another example, the request 915 may be transmitted based on a user-defined or employer-defined configuration. For example, if it is a company vehicle, the request 915 may be transmitted based on a confirmation that the first device 802 is a company device.

The request 915 may be a request to perform a handover of one or more components of the session in progress 912, such as an audio component or a video component, from the first device 902 to the third device 906. In an example, the request 815 may be transmitted based on a vehicle motion status. For example, if the vehicle motion status indicates that the vehicle is in motion, the request 915 may be to perform a handover of the audio component of the session in progress. If the vehicle motion status indicates that the vehicle is stationary, the request 915 may be to perform a handover of the audio component of the session in progress, the video component of the session in progress, or both. In some examples, the user may be prompted on the first device 902 to confirm that a handover of the session in progress 912, or a component thereof, to the third device 906 is desired before the request 915 is transmitted. If the first device 902 does not detect the short range signal, the first device may receive a sharing key via a user input and transmit the request 915 to the server 908. The sharing key may be a secure code to associate the first device 902 and the third device 906.

If the first device 902 is not pre-authorized, the server 908 may perform an authentication with the third device 906 by transmitting/receiving an authentication request/response 916. The authentication request may include device information of the first device 902. The device information may include a device ID, a device type, a device location (i.e., room name), a device model, a device address, or any combination thereof. The third device 906 may use the device information for the handover. Upon completion of the authentication, the server 908 may initiate the handover by opening 917 a communication channel between the first device 902, the second device 904, and the third device 906. Opening the communication channel may include mapping the frequency signature to the third device 906. If the first device 902 is pre-authorized, the authentication step may be eliminated, and the server 908 may initiate the handover by opening 917 the communication channel between the first device 902, the second device 904, and the third device 906. In some examples, the first device 902 may deactivate the detector after initiating the handover. In some examples, the third device 906 may transmit an acknowledgement 918 to the server 908 that indicates that the communication channel between the first device 902, the second device 904, and the third device 906 is open.

In this example, the server 908 transmits a handover command 919 to the first device 902. The handover command 919 may include information associated with the third device 906, the session in progress 912, or both, to facilitate the handover. The handover is performed 920 such that the session in progress 912 is transferred from the first device 902 to the third device 906 over the communication channel such that the user may continue 922 the session in progress between the second device 904 and the third device 906 without interruption.

In this example, the session in progress 912, or a component thereof, may continue after the handover of the session to the third device 906. In an example where a vehicle is in motion, an audio component of the session in progress may be transferred the third device 906 while a video component of the session in progress is terminated. In an example where the vehicle is stationary, the audio component of the session in progress, the video component of the session in progress, or both, may be transferred the third device 906. The first device 902 may transmit sensor data 924 to the server 908. The server 908 may perform a mobility determination 926 based on the sensor data. The mobility determination may be based on a timer. For example, the timer may be based on a duration of time where the server 908 determines motion or not. If the server 908 determines that the first device 902 is no longer at the location of the third device 906, the server 908 may terminate the session between the second device 904 and the third device 906 and continue the session between the first device 902 and the second device 904. If the server 908 determines that the first device 902 remains at the location of the third device 906, the server 908 may terminate the session between the first device 902 and the second device 904 and continue the session between the second device 904 and the third device 906. The session between the first device 902 and the second device 904 may be terminated by transmitting a termination signal 928 to the first device 902.

Figure 10:
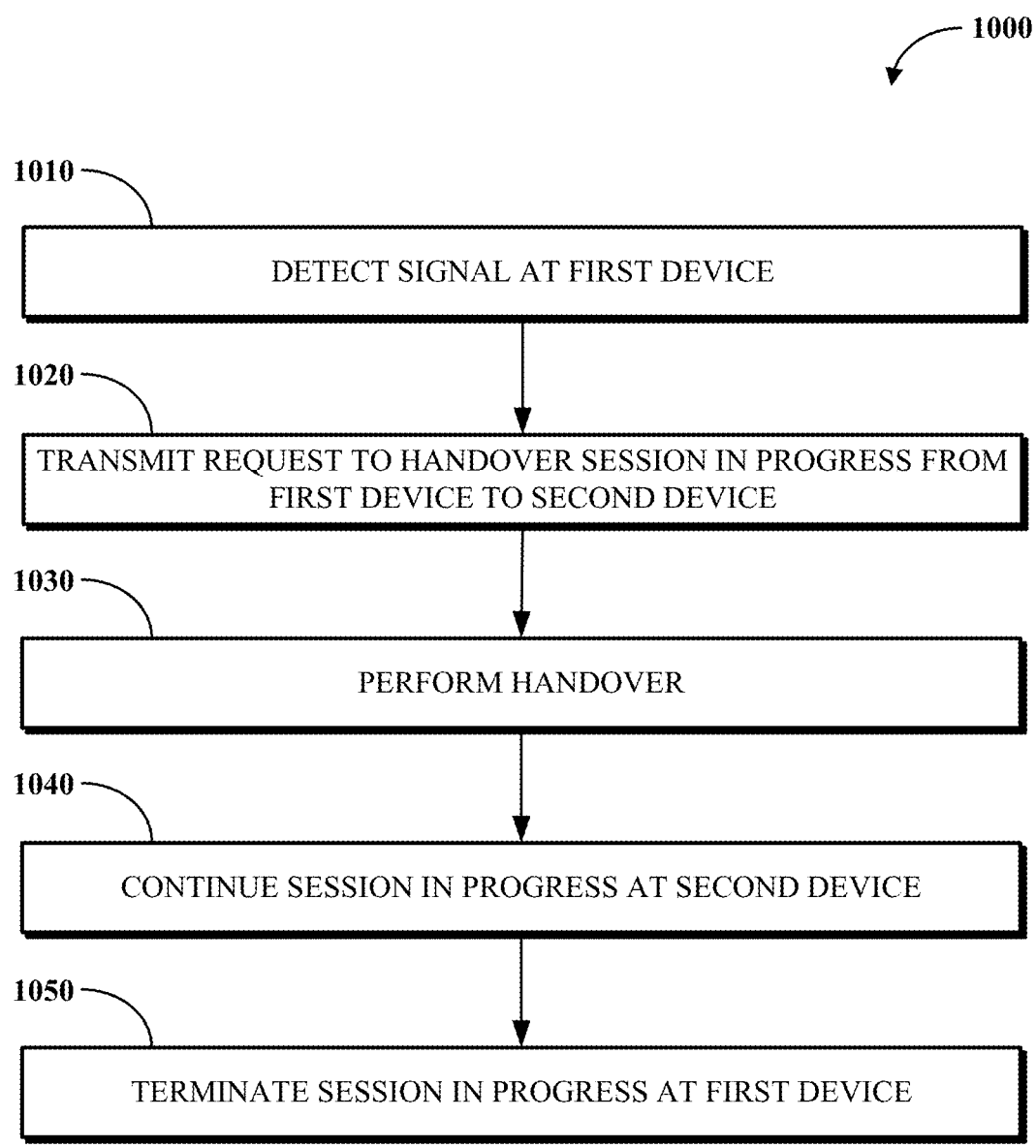
FIG. 10 is a flowchart of an example of a method for performing a proximity-based session handover.

To further describe some implementations in greater detail, reference is next made to examples of techniques which may be performed by or using a system and method for proximity-based session handover. FIG. 10 is a flowchart of an example of a method 1000 for performing a proximity-based session handover. The method 1000 can be executed using computing devices, such as the systems, hardware, and software described with respect to FIGS. 1-9. The method 1000 can be performed, for example, by executing a machine-readable program or other computer-executable instructions, such as routines, instructions, programs, or other code. The steps, or operations, of the method 1000 or another technique, method, process, or algorithm described in connection with the implementations disclosed herein can be implemented directly in hardware, firmware, software executed by hardware, circuitry, or a combination thereof.

For simplicity of explanation, the method 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1010, the method 1000 includes detecting a signal at a first device. The signal may be a non-penetrating signal such as a short range signal, an IR signal, a UWB signal, an NFC signal, a DSRC signal, or an ultrasonic signal. The first device may be a mobile device such as a mobile phone, a tablet computing device, or a laptop computer. The first device may have a session in progress with another device. The session in progress may be an interaction such as a video or audio conference, an email messaging session, a chat or instant messaging session, or any combination thereof. In this example, the user of the first device may move to a location on the customer premises that contains a second device. The second device may be a stationary device, such as a desk phone, a room appliance, a video conferencing system, a teleconferencing system, or the like. The second device may be configured to transmit the non-penetrating signal. The user may wish to automatically handover the session in progress from the first device to the second device upon entering the location where the second device is located.

At 1020, the method 1000 includes transmitting a request to handover a session in progress from the first device to a second device. To avoid performing an unintended handover, the request may be transmitted based on a threshold duration of time that the non-penetrating signal is detected. For example, the system may wait to ensure that the short range signal is detected for the threshold duration of time to avoid a false positive of a device crossing into a signal range of the short range signal without the intention of a session handover. The request may include a sharing key. The sharing key may be a secure code to associate the first device and the second device. In some examples, the technique 1000 may include detecting a sensor input at the first device during the session in progress. In response to detecting the sensor input, a monitor may be activated to detect the non-penetrating signal. The handover request may be transmitted based on detecting the non-penetrating signal. In some examples, transmitting the request to handover the session in progress is based on a threshold duration of time that the non-penetrating signal is detected.

At 1030, the method 1000 includes performing a handover. Performing the handover may include opening a communication channel. The communication channel may be opened between the first device and the second device, between the second device and the other device, or both. Opening the communication channel may include mapping a frequency signature of the non-penetrating signal to the second device. Performing the handover includes transferring the session in progress from the first device to the second device.

At 1040, the method 1000 includes continuing the session in progress at the second device. The session in progress is continued at the second device without interruption.

At 1050, the method 1000 includes terminating the session in progress at the first device. In some examples, the method 1000 may include detecting a sensor input at the first device during the session in progress at the second device. In response to detecting the sensor input, a monitor may be initiated to detect the non-penetrating signal. If the non-penetrating signal is not detected, a handover of the session in progress to the first device may be performed. The handover to the first device may be performed when a duration of time of not detecting the non-penetrating signal exceeds a predetermined duration of time.

Figure 11:
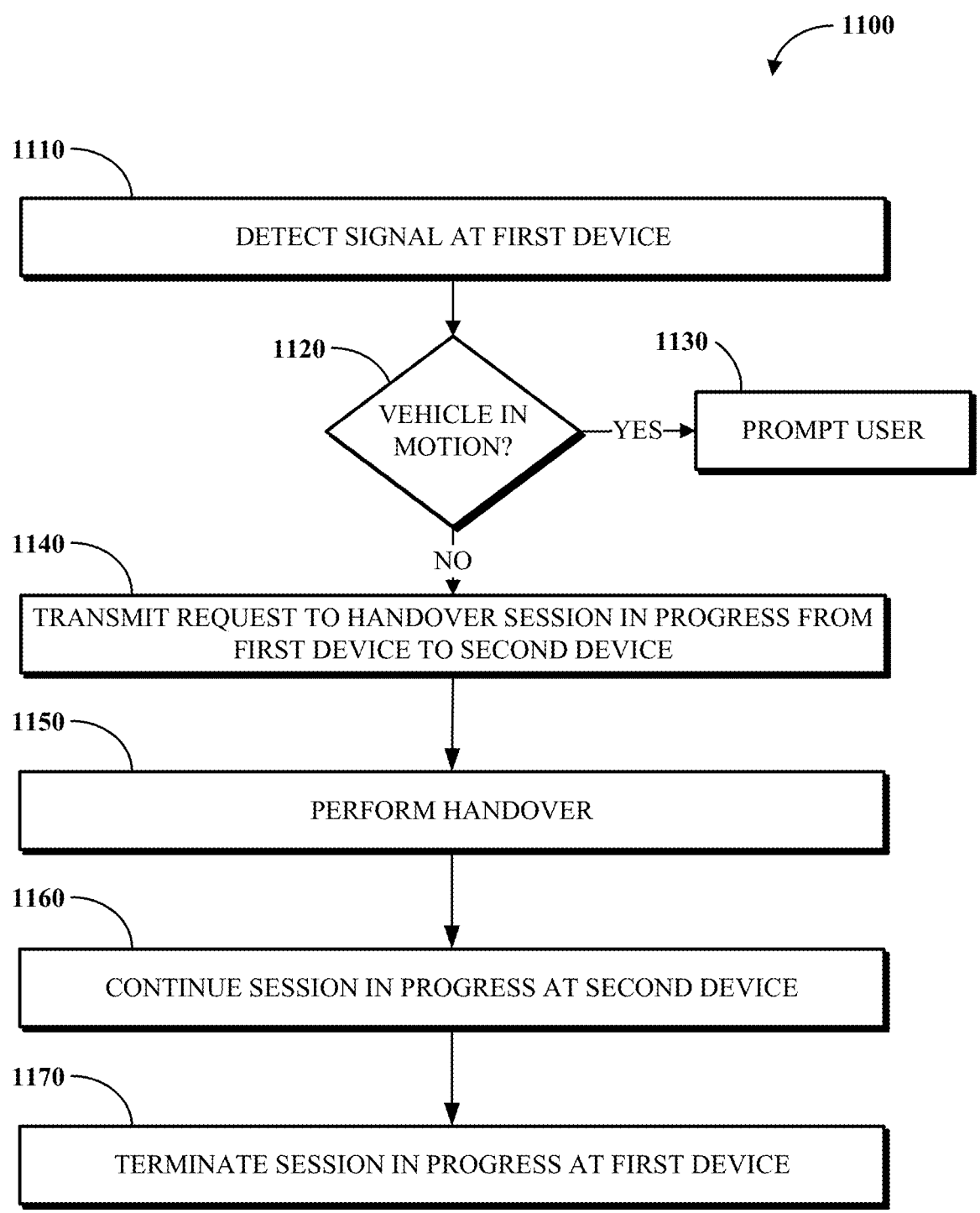
FIG. 11 is a flowchart of an example of a method for performing proximity-based session handover to a vehicle.

FIG. 11 is a flowchart of an example of a method 1100 for performing proximity-based session handover to a vehicle. The method 1100 can be executed using computing devices, such as the systems, hardware, and software described with respect to FIGS. 1-9. The method 1100 can be performed, for example, by executing a machine-readable program or other computer-executable instructions, such as routines, instructions, programs, or other code. The steps, or operations, of the method 1100 or another technique, method, process, or algorithm described in connection with the implementations disclosed herein can be implemented directly in hardware, firmware, software executed by hardware, circuitry, or a combination thereof.

For simplicity of explanation, the method 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1110, the method 1100 includes detecting a signal at a first device. The signal may be a non-penetrating signal such as a short range signal, an IR signal, a UWB signal, an NFC signal, or an ultrasonic signal. The first device may be a mobile device such as a mobile phone, a tablet computing device, or a laptop computer. The first device may have a session in progress with another device. The session in progress may be an interaction such as a video or audio conference, an email messaging session, a chat or instant messaging session, or any combination thereof. In this example, the user of the first device may move to a vehicle, such as an automobile, that contains a second device. The second device may be an infotainment device of the vehicle or a conferencing device for use in a vehicle. The second device may be configured to transmit the signal. The user may wish to automatically handover the session in progress, or a component thereof, from the first device to the second device upon entering the vehicle.

In some examples, detection of the signal may trigger a prompt to be transmitted to the first device, the second device, or both. The prompt may be a notification requesting a confirmation of whether to perform a handover of the session in progress.

At 1120, the method 1100 includes determining whether the vehicle is in motion. If it is determined that the vehicle is in motion, the method 1100 includes prompting 1130 the user. Prompting 1130 the user may include transmitting a notification to the first device, the second device, or both. The notification may include an audible alert, a visual alert, a text instruction, or haptic feedback, for example, via the steering wheel or seat of the vehicle. The notification may indicate an instruction to the user to stop the vehicle in order to transfer the session in progress to the second device.

If it is determined that the vehicle is not in motion (i.e. the vehicle is stationary), at 1140, the method 1100 includes transmitting a request to handover a session in progress, or a component thereof, from the first device to the second device, for example, based on receiving a confirmation to perform the handover of the session in progress. For example, when the vehicle is stationary, the request to handover the session in progress may include a request to handover an audio component of the session in progress, a video component of the session in progress, or both. To avoid performing an unintended handover, the request may be transmitted based on a threshold duration of time that the signal is detected. For example, the system may wait to ensure that the signal is detected for the threshold duration of time to avoid a false positive of a device crossing into a signal range of the signal without the intention of a session handover. The request may include a sharing key. The sharing key may be a secure code to associate the first device and the second device. In some examples, the method 1100 may include detecting a sensor input at the first device during the session in progress. In response to detecting the sensor input, a monitor may be activated to detect the signal. The handover request may be transmitted based on detecting the signal. In some examples, transmitting the request to handover the session in progress is based on a threshold duration of time that the signal is detected.

In some implementations, the first device may automatically switch to a hotspot mode, for example, based on the detection of the signal, confirmation that a handover of the session in progress is to be performed, or both. Switching to a hotspot mode allows the vehicle to use the first device as an internet source. For example, the second device may connect to the first device that is in hotspot mode, and the session in progress can be continued on the second device using the first device as the internet source.

At 1150, the method 1100 includes performing a handover. Performing the handover may include opening a communication channel. A communication channel may be opened for an audio component of the session in progress, a video component of the session in progress, or both. In some examples, a communication channel may be opened for each of the audio component and the video component of the session in progress. The communication channel may be opened between the first device and the second device, between the second device and the other device, or both. Opening the communication channel may include mapping a frequency signature of the non-penetrating signal to the second device. Performing the handover includes transferring the session in progress from the first device to the second device.

At 1160, the method 1100 includes continuing the session in progress, or a component thereof, at the second device. In some implementations, the session in progress may be continued by transferring the session in progress from an internet source of the first device to an in-vehicle internet source. In some implementations, the second device may connect to the first device that is in hotspot mode, and the session in progress can be continued on the second device using the first device as the internet source. The session in progress is continued at the second device without interruption. In one example, the session in progress, or a component thereof, may be continued at the second device via the first device, for example, via a Bluetooth connection or USB connection where the first device can communicate with a server, such as server 508, 608, 708, 808, 908, shown in FIGS. 5-9, respectively. In another example, the session in progress, or a component thereof, may be continued at the second device via an in-vehicle internet connection that is configured to communicate directly with the server.

At 1170, the method 1100 includes terminating the session in progress at the first device. In some examples, the method 1100 may include detecting a sensor input at the first device during the session in progress at the second device. In response to detecting the sensor input, a monitor may be initiated to detect the signal. If the signal is not detected, a handover of the session in progress to the first device may be performed. The handover to the first device may be performed when a duration of time of not detecting the signal exceeds a predetermined duration of time.

Figure 12:
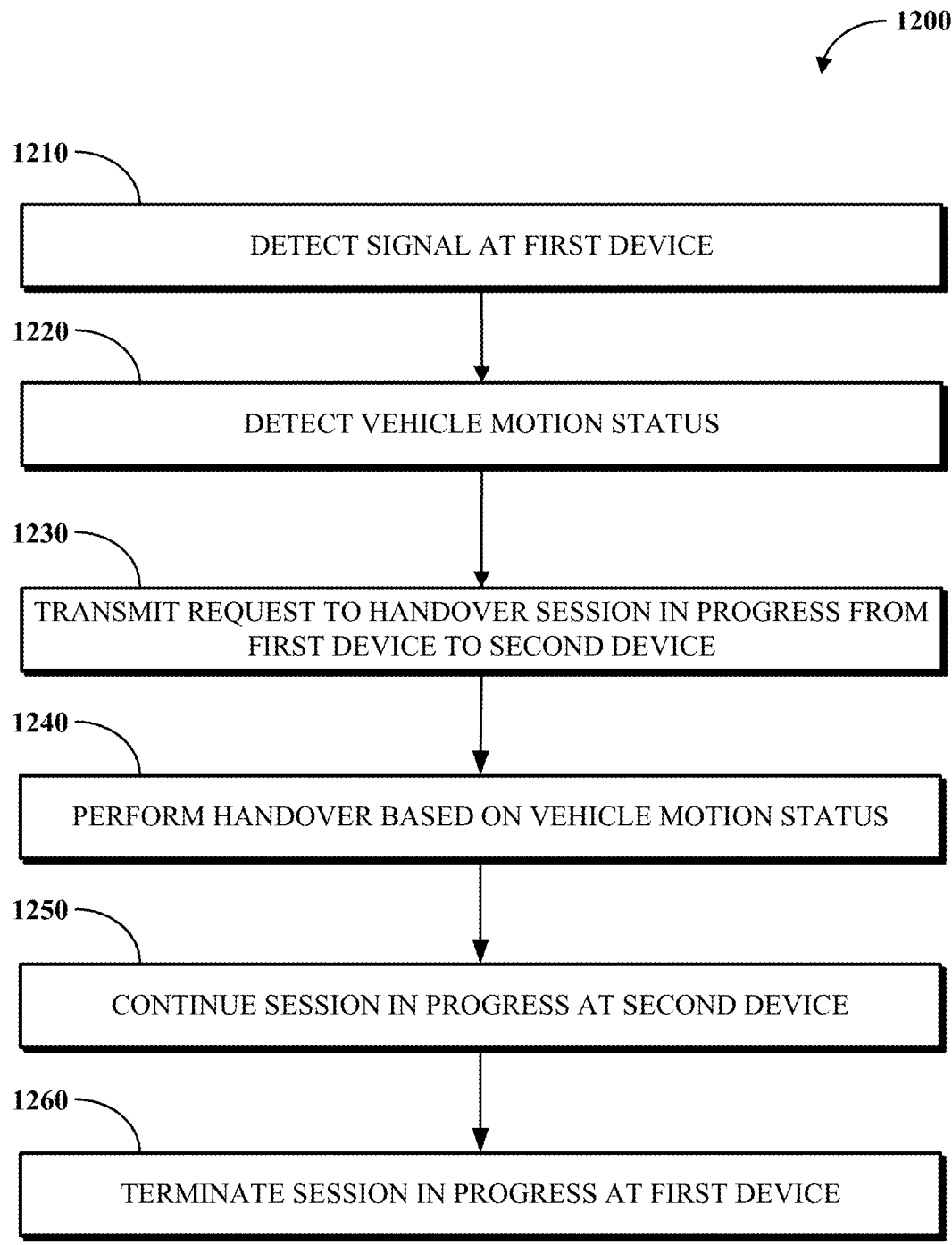
FIG. 12. is a flowchart of another example of a method for performing proximity-based session handover to a vehicle.

FIG. 12 is a flowchart of another example of a method 1200 for performing proximity-based session handover to a vehicle. The method 1200 can be executed using computing devices, such as the systems, hardware, and software described with respect to FIGS. 1-9. The method 1200 can be performed, for example, by executing a machine-readable program or other computer-executable instructions, such as routines, instructions, programs, or other code. The steps, or operations, of the method 1200 or another technique, method, process, or algorithm described in connection with the implementations disclosed herein can be implemented directly in hardware, firmware, software executed by hardware, circuitry, or a combination thereof.

For simplicity of explanation, the method 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1210, the method 1200 includes detecting a signal at a first device. The signal may be a non-penetrating signal such as a short range signal, an IR signal, a UWB signal, an NFC signal, or an ultrasonic signal. The first device may be a mobile device such as a mobile phone, a tablet computing device, or a laptop computer. The first device may have a session in progress with another device. The session in progress may be an interaction such as a video or audio conference, an email messaging session, a chat or instant messaging session, or any combination thereof. In this example, the user of the first device may move to a vehicle, such as an automobile, that contains a second device. The second device may be an infotainment device of the vehicle or a conferencing device for use in a vehicle. The second device may be configured to transmit the signal. The user may wish to automatically handover the session in progress, or a component thereof, from the first device to the second device upon entering the vehicle.

In some examples, detection of the signal may trigger a prompt to be transmitted to the first device, the second device, or both. The prompt may be a notification requesting a confirmation of whether to perform a handover of the session in progress.

At 1220, the method 1200 includes detecting a vehicle motion status. The detected vehicle motion status may indicate that the vehicle is in motion or that the vehicle is stationary.

At 1230, the method 1200 includes transmitting a request to handover a session in progress, or a component thereof, from the first device to the second device, for example, based on receiving a confirmation to perform the handover of the session in progress. For example, when the vehicle motion status indicates that the vehicle is stationary, the request to handover the session in progress may include a request to handover an audio component of the session in progress, a video component of the session in progress, or both. In an example where the vehicle motion status indicates that the vehicle is in motion, the request to handover the session in progress may include a request to handover the audio component of the session in progress. In an example where the vehicle motion status indicates that the vehicle is in motion and the second device is located in an area of the vehicle such that it does not distract the driver (i.e., the back seat of the vehicle or a separate passenger compartment), the request to handover the session in progress may include a request to handover the audio component of the session in progress, the video component of the session in progress, or both. In an example where the vehicle motion status indicates that the vehicle is in motion and the vehicle is a driverless vehicle (i.e., autonomous vehicle), the request to handover the session in progress may include a request to handover the audio component of the session in progress, the video component of the session in progress, or both.

To avoid performing an unintended handover, the request may be transmitted based on a threshold duration of time that the signal is detected. For example, the system may wait to ensure that the signal is detected for the threshold duration of time to avoid a false positive of a device crossing into a signal range of the signal without the intention of a session handover. The request may include a sharing key. The sharing key may be a secure code to associate the first device and the second device. In some examples, the method 1200 may include detecting a sensor input at the first device during the session in progress. In response to detecting the sensor input, a monitor may be activated to detect the signal. The handover request may be transmitted based on detecting the signal. In some examples, transmitting the request to handover the session in progress is based on a threshold duration of time that the signal is detected.

In some implementations, the first device may automatically switch to a hotspot mode, for example, based on the detection of the signal, confirmation that a handover of the session in progress is to be performed, or both. Switching to a hotspot mode allows the vehicle to use the first device as an internet source. For example, the second device may connect to the first device that is in hotspot mode, and the session in progress can be continued on the second device using the first device as the internet source.

At 1240, the method 1200 includes performing a handover based on the vehicle motion status. Performing the handover may include opening a communication channel. A communication channel may be opened for an audio component of the session in progress, a video component of the session in progress, or both, based on one or more of the vehicle motion status and location of the second device in the vehicle. In some examples, a communication channel may be opened for each of the audio component and the video component of the session in progress. The communication channel may be opened between the first device and the second device, between the second device and the other device, or both. Opening the communication channel may include mapping a frequency signature of the signal to the second device. Performing the handover includes transferring the session in progress from the first device to the second device.

At 1250, the method 1200 includes continuing the session in progress, or a component thereof, at the second device. In some implementations, the session in progress may be continued by transferring the session in progress from an internet source of the first device to an in-vehicle internet source. In some implementations, the second device may connect to the first device that is in hotspot mode, and the session in progress can be continued on the second device using the first device as the internet source. The session in progress is continued at the second device without interruption. In one example, the session in progress, or a component thereof, may be continued at the second device via the first device, for example, via a Bluetooth connection or USB connection where the first device can communicate with a server, such as server 508, 608, 708, 808, 908, shown in FIGS. 5-9, respectively. In another example, the session in progress, or a component thereof, may be continued at the second device via an in-vehicle internet connection that is configured to communicate directly with the server.

At 1260, the method 1200 includes terminating the session in progress at the first device. In some examples, the method 1200 may include detecting a sensor input at the first device during the session in progress at the second device. In response to detecting the sensor input, a monitor may be initiated to detect the signal. If the signal is not detected, a handover of the session in progress to the first device may be performed. The handover to the first device may be performed when a duration of time of not detecting the signal exceeds a predetermined duration of time.

An aspect includes a method that includes detecting, at a mobile device, an ultrasonic signal that includes a frequency signature of a stationary device. The method may include mapping the frequency signature to the stationary device to open a communication channel. The method may include transferring a session in progress from the mobile device to the stationary device via the communication channel.

An aspect may include a system that comprises a mobile device and a server. The mobile device may be configured to detect an ultrasonic signal that includes a frequency signature of a stationary device. The server may be configured to map the frequency signature to the stationary device to open a communication channel. The server may be configured to transfer a session in progress from the mobile device to the stationary device via the communication channel.

An aspect includes a non-transitory computer-readable medium comprising instructions that when executed by a processor, cause the processor to perform operations. The operations may include detecting, at a mobile device, an ultrasonic signal that includes a frequency signature of a stationary device. The operations may include mapping the frequency signature to the stationary device to open a communication channel. The operations may include transferring a session in progress from the mobile device to the stationary device via the communication channel.

In one or more aspects, the communication channel may be opened between the mobile device and the stationary device. In one or more aspects, an audio component of the session in progress may be transferred from the mobile device to the stationary device. In one or more aspects, a sensor input may be detected at the mobile device during the session in progress. In one or more aspects, a monitor may be initiated to detect the ultrasonic signal in response to detecting the sensor input. In one or more aspects, a handover of the audio component of the session in progress to the mobile device may be performed in response to the absence of detecting the ultrasonic signal. In one or more aspects, the handover of the audio component of the session in progress to the mobile device may be performed responsive to the absence of detecting that the ultrasonic signal exceeds a predetermined duration of time. In one or more aspects, a handover of an audio component of the session in progress to the stationary device may be performed in response to detecting the ultrasonic signal. In one or more aspects, a request to handover an audio component of the session in progress from the mobile device to the stationary device may be transmitted. In one or more aspects, transferring the session in progress to the stationary device may include handing over an audio component and a video component. In one or more aspects, the ultrasonic signal may be an IR signal, an UWB signal, an NFC signal, or a Bluetooth signal.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   detecting motion at a mobile device;
   determining a distance that the mobile device has traveled from an initial location where the motion is detected;
   responsive to detecting motion and determining that the distance meets a predetermined threshold, activating, at the mobile device, an ultrasonic signal receiver, wherein the ultrasonic signal receiver remains deactivated until both conditions are met;
   detecting, at the mobile device, an ultrasonic signal that includes a frequency signature of a stationary device;
   mapping the frequency signature to the stationary device to uniquely and securely identify the stationary device and to open a communication channel; and
   transferring a session in progress from the mobile device to the stationary device via the communication channel without user intervention and without interruption of the session in progress.

2. The method of claim 1, wherein transferring the session in progress to the stationary device comprises:
opening the communication channel between the mobile device and the stationary device; and
transferring an audio component of the session in progress from the mobile device to the stationary device via the communication channel.

3. The method of claim 2, further comprising:
detecting a sensor input at the mobile device during the session in progress at the stationary device; and
performing a handover of the audio component of the session in progress to the mobile device in response to an absence of detecting the ultrasonic signal.

4. The method of claim 2, further comprising:
detecting a sensor input at the mobile device during the session in progress at the stationary device; and
performing a handover of the audio component of the session in progress to the mobile device in response to an absence of detecting the ultrasonic signal, wherein the handover of the audio component of the session in progress to the mobile device is performed responsive to the absence of detecting that the ultrasonic signal exceeds a predetermined duration of time.

5. The method of claim 1, further comprising:
detecting a sensor input at the mobile device during the session in progress; and
performing a handover of an audio component of the session in progress to the stationary device in response to detecting the ultrasonic signal.

6. The method of claim 1, further comprising:
detecting a sensor input at the mobile device during the session in progress; and
transmitting a request to handover an audio component of the session in progress from the mobile device to the stationary device.

7. The method of claim 1, wherein transferring the session in progress to the stationary device includes handing over an audio component and a video component.

8. The method of claim 1, wherein the ultrasonic signal is an infrared (IR) signal, an ultra-wideband (UWB) signal, a near-field communications (NFC) signal, or a Bluetooth signal.

9. A system, comprising:
a mobile device configured to:
detect motion;
determine a distance that the mobile device has traveled from an initial location where the motion is detected;
responsive to the detected motion and a determination that the distance meets a predetermined threshold, activate an ultrasonic signal receiver, wherein the ultrasonic signal receiver remains deactivated until both conditions are met;
detect an ultrasonic signal that includes a frequency signature of a stationary device; and
a server configured to:
map the frequency signature to the stationary device to uniquely and securely identify the stationary device and to open a communication channel; and
transfer a session in progress from the mobile device to the stationary device via the communication channel without user intervention and without interruption of the session in progress.

10. The system of claim 9, wherein the server is configured to:
open the communication channel between the mobile device and the stationary device; and
transfer an audio component of the session in progress from the mobile device to the stationary device via the communication channel.

11. The system of claim 10, wherein the mobile device is configured to:
detect a sensor input during the session in progress at the stationary device; and
wherein the server is configured to:
perform a handover of the audio component of the session in progress to the mobile device in response to an absence of detecting the ultrasonic signal.

12. The system of claim 10, wherein the mobile device is configured to:
detect a sensor input during the session in progress at the stationary device; and
wherein the server is configured to:
perform a handover of the audio component of the session in progress to the mobile device in response to an absence of detecting the ultrasonic signal, wherein the handover of the audio component of the session in progress to the mobile device is performed responsive to the absence of detecting that the ultrasonic signal exceeds a predetermined duration of time.

13. The system of claim 9, wherein the mobile device is configured to:
detect a sensor input during the session in progress; and
wherein the server is configured to:
perform a handover of an audio component of the session in progress to the stationary device in response to detecting the ultrasonic signal.

14. The system of claim 9, wherein the mobile device is configured to:
detect a sensor input at the mobile device during the session in progress; and
wherein the server is configured to:
transmit a request to handover an audio component of the session in progress from the mobile device to the stationary device.

15. The system of claim 9, wherein the ultrasonic signal is an infrared (IR) signal, an ultra-wideband (UWB) signal, a near-field communications (NFC) signal, or a Bluetooth signal.

16. A non-transitory computer-readable medium comprising instructions that when executed by a processor, cause the processor to perform operations comprising:
detecting motion at a mobile device;
determining a distance that the mobile device has traveled from an initial location where the motion is detected;
responsive to detecting motion and determining that the distance meets a predetermined threshold, activating, at the mobile device, an ultrasonic signal receiver, wherein the ultrasonic signal receiver remains deactivated until both conditions are met;
detecting, at the mobile device, an ultrasonic signal that includes a frequency signature of a stationary device;
mapping the frequency signature to the stationary device to uniquely and securely identify the stationary device and to open a communication channel; and
transferring a session in progress from the mobile device to the stationary device via the communication channel without user intervention and without interruption of the session in progress.

17. The non-transitory computer-readable medium of claim 16, wherein the operations further comprise:
opening the communication channel between the mobile device and the stationary device; and transferring an audio component of the session in progress from the mobile device to the stationary device via the communication channel.

18. The non-transitory computer-readable medium of claim 17, wherein the operations further comprise:
   detecting a sensor input at the mobile device during the session in progress at the stationary device; and
   performing a handover of the audio component of the session in progress to the mobile device in response to an absence of detecting the ultrasonic signal.

19. The non-transitory computer-readable medium of claim 17, wherein the operations further comprise:
   detecting a sensor input at the mobile device during the session in progress at the stationary device; and
   performing a handover of the audio component of the session in progress to the mobile device in response to an absence of detecting the ultrasonic signal, wherein the handover of the audio component of the session in progress to the mobile device is performed responsive to the absence of detecting that the ultrasonic signal exceeds a predetermined duration of time.

20. The non-transitory computer-readable medium of claim 16, wherein the operations further comprise:
   detecting a sensor input at the mobile device during the session in progress; and
   performing a handover of an audio component of the session in progress to the stationary device in response to detecting the ultrasonic signal.

* * * * *